(12) United States Patent
Williams

(10) Patent No.: US 11,137,080 B2
(45) Date of Patent: Oct. 5, 2021

(54) DIAPHRAGM FOR FLUID CONTROL VALVE AND METHODS OF FLUID CONTROL

(71) Applicant: Tyco Fire Products LP, Lansdale, PA (US)

(72) Inventor: James O. Williams, Marlborough, MA (US)

(73) Assignee: Tyco Fire Products LP, Lansdale, PA (US)

( * ) Notice: Subject to any disclaimer, the term of this patent is extended or adjusted under 35 U.S.C. 154(b) by 175 days.

(21) Appl. No.: 16/468,489

(22) PCT Filed: Dec. 7, 2017

(86) PCT No.: PCT/US2017/065051
§ 371 (c)(1),
(2) Date: Jun. 11, 2019

(87) PCT Pub. No.: WO2018/111673
PCT Pub. Date: Jun. 21, 2018

(65) Prior Publication Data
US 2020/0011436 A1    Jan. 9, 2020

Related U.S. Application Data

(60) Provisional application No. 62/433,572, filed on Dec. 13, 2016, provisional application No. 62/433,488,
(Continued)

(51) Int. Cl.
*F16K 7/12* (2006.01)
*F16K 7/17* (2006.01)
(Continued)

(52) U.S. Cl.
CPC .............. *F16K 7/123* (2013.01); *F16K 7/126* (2013.01); *F16K 7/17* (2013.01); *F16K 27/0236* (2013.01);
(Continued)

(58) Field of Classification Search
CPC . F16K 7/123; F16K 7/126; F16K 7/17; F16K 27/0236; F16K 31/1266;
(Continued)

(56) References Cited

U.S. PATENT DOCUMENTS

RE19,151 E    5/1934 Saunders
1,978,603 A    10/1934 Saunders
(Continued)

FOREIGN PATENT DOCUMENTS

CN    101548122 A    9/2009
CN    105828889        8/2016
(Continued)

OTHER PUBLICATIONS

International Search Report and Written Opinion for International Application No. PCT/US2017/065051, dated Mar. 27, 2018, 19 pages.
(Continued)

*Primary Examiner* — Umashankar Venkatesan
(74) *Attorney, Agent, or Firm* — Foley & Lardner LLP

(57) ABSTRACT

A fluid control valve includes a cover portion and a body portion. Inner surfaces of the cover and the body portion define a chamber that includes an inlet and an outlet in communication with the chamber. The fluid control valve also includes a diaphragm disposed between the cover portion and the body portion. The diaphragm has a flexible member that is disposed within the chamber for controlling communication between the inlet and the outlet. The upper surface of the flexible member has a substantially smooth wall portion. The flexible member has an inverted position in which the upper surface conforms to at least a portion of the inner surface of the cover portion to define a passageway that permits communication between the inlet and the outlet. The diaphragm is configured such that the lower surface of
(Continued)

the flexible member and a seat member on the body portion have corresponding radius of curvatures such that the flexible member conforms to and seals against the seat member when the flexible member is not in the inverted position.

18 Claims, 19 Drawing Sheets

Related U.S. Application Data filed on Dec. 13, 2016, provisional application No. 62/433,453, filed on Dec. 13, 2016, provisional application No. 62/433,541, filed on Dec. 13, 2016.

(51) Int. Cl.
*F16K 27/02* (2006.01)
*F16J 3/02* (2006.01)
*F16K 31/145* (2006.01)
*A62C 35/68* (2006.01)
*F16K 31/126* (2006.01)
*F16K 31/385* (2006.01)

(52) U.S. Cl.
CPC ............... *A62C 35/68* (2013.01); *F16J 3/02* (2013.01); *F16K 31/126* (2013.01); *F16K 31/1266* (2013.01); *F16K 31/145* (2013.01); *F16K 31/385* (2013.01)

(58) Field of Classification Search
CPC .... F16K 31/126; F16K 31/385; F16K 31/145; A62C 35/68; F16J 3/02
See application file for complete search history.

(56) References Cited

U.S. PATENT DOCUMENTS

| | | | | |
|---|---|---|---|---|
| 3,026,909 | A | | 3/1962 | Boteler |
| 3,083,943 | A | | 4/1963 | Stewart, Jr. et al. |
| 3,257,097 | A | * | 6/1966 | Boteler ............... F16K 27/0236 251/331 |
| 3,659,625 | A | | 5/1972 | Coiner et al. |
| 3,856,046 | A | * | 12/1974 | Brown ................. F16K 31/385 137/625.28 |
| 4,367,983 | A | * | 1/1983 | Streich ............... E02B 17/0013 405/227 |
| 4,755,111 | A | | 7/1988 | Cocchi et al. |
| 4,887,516 | A | | 12/1989 | Scott et al. |
| 5,464,064 | A | * | 11/1995 | Weingarten ............ A62C 35/64 169/22 |
| 5,632,465 | A | | 5/1997 | Cordua |
| 6,095,484 | A | * | 8/2000 | Frenkel ................. F16K 7/126 137/488 |
| 6,102,071 | A | | 8/2000 | Walton et al. |
| 8,816,234 | B2 | | 8/2014 | MacDonald et al. |
| 10,471,287 | B2 | * | 11/2019 | Williams ............... A62C 35/68 |
| 2005/0205815 | A1 | * | 9/2005 | Frenkel ................ F16K 31/145 251/61.1 |
| 2006/0289824 | A1 | | 12/2006 | Wincek |
| 2014/0077108 | A1 | | 3/2014 | Ringer et al. |
| 2014/0264104 | A1 | | 9/2014 | Ringer et al. |
| 2015/0219233 | A1 | * | 8/2015 | Ringer .................. A62C 35/68 137/535 |
| 2016/0003364 | A1 | * | 1/2016 | Ringer ................ F16K 27/0263 137/625.48 |
| 2016/0279454 | A1 | | 9/2016 | Ringer et al. |

FOREIGN PATENT DOCUMENTS

| | | |
|---|---|---|
| DE | 90 02 675 | 6/1990 |
| EP | 0 250 026 | 12/1987 |
| EP | 0 626 905 | 12/1994 |
| EP | 2 971 886 A1 | 1/2016 |
| GB | 1 372 223 | 10/1974 |
| GB | 2 024 372 | 1/1980 |
| GB | 2 231 126 | 11/1990 |
| JP | 2005-098342 | 11/2005 |
| WO | WO-99/10669 A1 | 3/1999 |
| WO | WO-2008/051871 | 5/2008 |
| WO | WO-2014/151971 | 9/2014 |
| WO | WO-2015/181709 A1 | 12/2015 |
| WO | WO-2016/179406 A1 | 11/2016 |

OTHER PUBLICATIONS

International Search Report and Written Opinion for International Application No. PCT/US2017/065061, dated Mar. 27, 2018, 18 pages.

International Search Report and Written Opinion for International Application No. PCT/US2017/065065, dated Mar. 23, 2018, 15 pages.

International Search Report and Written Opinion for International Application No. PCT/US2017/065073, dated Mar. 27, 2018, 14 pages.

\* cited by examiner

DIAPHRAGM FOR FLUID CONTROL VALVE AND METHODS OF FLUID CONTROL

This international application claims the benefit of priority to U.S. Provisional Patent App. Nos. 62/433,453 filed Dec. 13, 2016, 62/433,488 filed Dec. 13, 2016, 62/433,541 filed Dec. 13, 2016, and 62/433,572 filed Dec. 13, 2016, each of which is incorporated herein by reference in its entirety.

BACKGROUND OF THE INVENTION

Diaphragm-type fluid control valves can provide controlled fluid separation and flow along a pipe-line, manifold or other piping network. Generally, the diaphragm-type valve includes a flexible diaphragm element to control fluid flow between the inlet and the outlet of the valve body. More specifically, in known diaphragm-type valves, the flexible element engages a seat formed within the valve body to separate the interior chamber of the valve body into three parts: (i) the inlet chamber which can hold the supply fluid, (ii) and outlet chamber which receives fluid from the inlet chamber for discharge out the outlet and (iii) a diaphragm chamber which can hold a fluid under pressure to maintain the diaphragm element in the seated position. Upon release of fluid pressure from the diaphragm chamber, the diaphragm element can be displaced from the seated position by the pressure of fluid in the inlet chamber and fluid flow is permitted between the inlet and the outlet chambers.

To ensure the diaphragm seals properly, the above-described diaphragm-type valves require a bias force to urge the diaphragm towards the valve seat even when there is fluid pressure in the inlet chamber. This is because, in typical systems, the source of the fluid to the diaphragm chamber is the inlet of the valve itself. Thus, when the diaphragm chamber has fluid under pressure, the pressure in the diaphragm chamber is equal to the inlet. This means that, while releasing the fluid pressure in the diaphragm chamber opens the valve, when the pressure is restored to the diaphragm chamber, the forces on each side of the diaphragm will be balanced until the diaphragm actually seats. Accordingly, to ensure the diaphragm is forced to the valve seat, a bias is needed to urge the diaphragm to the closed position. To this end, International Patent Publication No. WO 2008/051871 discloses a diaphragm with an elastomeric ring element disposed near an outer circumference of the diaphragm to urge the diaphragm member to a closed position. Specifically, the outer angled surface of the elastomeric ring element engages and provides pressure contact with a portion of the interior surface of the valve body to assist in urging the diaphragm towards its sealing position to permit closure of the valve. The diagram can also include a one or more rib members and an interior ring disposed in a central portion of the upper surface of the diaphragm to further urge the diagram to the seated position. Similarly, in U.S. Patent Application Publication No. 2005/0205815, the diaphragm is configured to include ribs and/or a ring that is attached to the diaphragm to bias the diaphragm towards the sealing position. Specifically, the upper face of the diaphragm has tangential ribs and radial ribs to urge the diaphragm towards the valve seat on the valve body. In addition, the diaphragm also includes a flexible ring element that is in pressure contact with the body of the valve to urge the diaphragm towards the seat to close the valve. However, the design and manufacturing process of the diaphragms will need to account for the ribs and/or rings, which can produce added complexity and/or expense in manufacture.

In some known valves, springs and/or other biasing devices engage the diaphragm such that, when the pressure in the diaphragm chamber is restored and the forces balance, the spring (or another biasing device) can urge the diaphragm to the closed position. For example, in UK Patent Application No. GB 2231126, a spring engages the diaphragm on an upper side of the diaphragm to force a lower side of the diaphragm to make contact with the valve seat. Once contact is made, the forces, due to the fluid pressures, are no longer balanced and the force on the upper side of the valve will be greater. However, to accommodate the spring, the upper cover of the valve must be made larger than needed and/or include features to receive the spring. In addition, at low rates, the biasing device can create vibrations that damage the diaphragm. Further, separate biasing devices such as springs can complicate the assembly of the valve and add extra costs to the valve assembly. Moreover, the closing force generated by the spring can produce an unacceptable pressure loss in the valve.

Further limitation and disadvantages of conventional, traditional, and proposed approaches to diaphragm-type valve configurations will become apparent to one skilled in the art, through comparison of such approaches with embodiments of the present invention as set forth in the remainder of the present disclosure with reference to the drawings.

SUMMARY OF THE INVENTION

Preferred embodiments of the present invention provide for a more precise control of the fluid flow and/or pressure in diaphragm-type control valves by employing a diaphragm having a simple construction with minimal stress concentrations during operation. In one preferred embodiment, a fluid control valve includes a valve body with a cover portion and a body portion. The inner surfaces of the cover portion and the body portion define a chamber. Preferably, the chamber has an axis and a plane substantially perpendicular to the axis. The chamber includes an inlet and an outlet in communication with the chamber and the inlet and outlet are substantially aligned along the axis. The fluid control valve also includes a diaphragm disposed between the cover portion and the body portion. Preferably, the diaphragm has a flexible member that is disposed within the chamber for controlling communication between the inlet and the outlet. Preferably, the flexible member has an upper surface having a substantially smooth wall portion. For example, the upper surface can have a constant radius of curvature and can be, e.g., bowl-shaped. In some embodiments, the substantially smooth wall portion circumscribes a substantially smooth central portion that, preferably, has an infinite radius of curvature. For example, the central portion can be a flat surface. The lower surface of the flexible member can have any texture. In some embodiments, the lower surface has a substantially smooth surface except for at least one elongated member disposed on the lower surface. "Substantially smooth" as used herein means a continuous level surface that has a constant radius of curvature or a slightly varying radius of curvature that approximates a constant radius of curvature without significant convex portions, or an infinite radius of curvature or a substantially infinite radius of curvature approximating a flat surface that is within manufacturing tolerances based on the method of manufacture and the properties of the materials used for the diaphragm. For example, a diaphragm with a substantially smooth surface can include non-functional features and structures such as, e.g., seams, minor imperfections, and minor variations in radius. In contrast, known diaphragms have ribs and/or other support structures, which means that the surface of the known diaphragms have numerous structures with varying radius of curvatures.

Preferably, when the pressure in the diaphragm chamber is released, the flexible member has a natural-inverted or partially inverted position in which the flexible member is upturned inside-out due to the pressure on the lower surface of the diaphragm. "Natural-inverted position" means the diaphragm shape in an inverted position corresponds to its natural full inverted state, for example, a hemisphere. When in the natural-inverted or partially inverted position, preferably, the upper surface conforms to a shape or profile of at least a portion of the inner surface of the cover to define a passageway that permits communication between the inlet and the outlet. "Conforms to" means that a surface of the flexible member generally follows the contour of an opposing surface and rests against at least a portion of the opposing surface. "Rests against" as used herein means that a contact between a surface of the flexible member and a second surface is such that the second surface aids in supporting the flexible member. Preferably, when inverted, the flexible member conforms to the inner surface of the cover. Preferably, at least a middle portion of the upper surface of the flexible member conforms to a profile of the inner surface of the cover portion when the flexible member is in the inverted position. In some embodiments, substantially the entire upper surface of the flexible member conforms to the profile of the inner surface of the cover portion. In some embodiments, the profile of the middle section of the inner surface of the cover portion can be a smooth concave surface. Preferably, the entire profile of the cover portion is a smooth concave surface. In other preferred embodiments, the profile can have other textures, shapes and/or contours.

The inner surface of the lower valve body can include one or more elongated seat members. Preferably, each elongated seat member is substantially aligned along the plane. Preferably, when in the non-inverted position (lower position), the flexible member conforms to and seals against each elongated seat member so as to prevent fluid communication between the inlet and the outlet. Preferably, the lower surface of the flexible member and each elongated seat member have corresponding radius of curvatures such that the flexible member conforms to and seals against each elongated seat member when the flexible member is in the non-inverted position (lower position). "Corresponding radius of curvatures" means a radius of curvature of the lower surface of the flexible member is substantially equal to a radius of curvature of an elongated seat member and/or a radius of curvature of a support member, as appropriate. For example, the radius of curvature of the lower surface of the flexible member is within ±3% of the radius of curvature of an elongated seat member and/or the radius of curvature of a support member, as appropriate. Preferably, the corresponding radius of curvatures are within ±2.5%, more preferably within ±2.0%, even more preferably within ±1.0%, and still even more preferably within ±0.5%. In some embodiments, the flexible member can include one or more elongated members protruding from the lower surface. Preferably, when the flexible member is in its natural non-inverted position (lower position), each protruding elongated member contacts an elongated seat member and seals against the seat member so as to prevent fluid communication between the inlet and the outlet. Once the protruding elongated member makes contact with the elongated seat member, the force on the upper surface of the flexible member will be greater than the force on the lower surface and the flexible diaphragm will firmly seal.

Preferably, the diaphragm member includes a reinforced fabric embedded in a rubber matrix. Because the reinforced fabric does not stretch as much as the rubber, a tension force is mostly concentrated in the reinforced fabric when the flexible member is forced to the inverted position. In some embodiments, the diaphragm is constructed such that, when the diaphragm is in the inverted position, a tension force within the diaphragm is such that it exclusively biases the flexible member to the lower position. "Exclusively biases" means that additional diaphragm structures such as, e.g., ribs and rings and biasing devices such as springs are not used to urge the flexible member to the lower position to seal against the elongated seat member.

The flexible member of the preferred control valve, preferably, axially separates two sub-chambers from one another. Preferably adjacent each of the two axially separated sub-chambers is a diaphragm chamber for controlled operation of the diaphragm, i.e., controlled operation of the flexible member between the inverted and lower positions. The preferred orientation of the diaphragm chamber relative to the axially spaced chambers provides that the diaphragm chamber can seal the axially spaced sub-chambers from one another with a diaphragm fluid pressure that is at the inlet sub-chamber pressure. Moreover, the preferred control valve, the diaphragm, and orientation of the sub-chambers provide for a controlled seal between the axially spaced sub-chambers that can compensate for fluctuations and surges in the fluid pressure in either of one of the two axially separated chambers. In one aspect, the preferred control valve can be installed in piping systems, such as for example, preaction fire protection systems that are known in the art. Thus, the preferred control valve can provide for a single and preferably substantially constant pressure between the control valve and, e.g., a network of sprinklers. In some embodiments, the preferred control valve includes an intermediate chamber in between the two sub-chambers. The intermediate chamber of the preferred control valve fills with pressurized fluid when the control valve is operated or the valve seal is improper. Preferably, the intermediate chamber is connected to an alarm. In some embodiments, the intermediate chamber provides for a drain to atmosphere.

In some embodiments, the inner surface of the body portion preferably includes a bridge element substantially aligned along the plane and preferably including at least two elongated seat members and a groove disposed between the elongated seat members. A portion of the body portion further preferably defines a port in communication with the groove. Preferably, the lower surface of the flexible member includes a pair of spaced apart elongated members defining a channel therebetween. The elongated members of the flexible member preferably are in sealed engagement with the at least two elongated seat members when in the non-inverted position such that the channel is in communication with the groove and the port.

Accordingly, the various preferred embodiments of the preferably hydraulically operated control valve, its diaphragm and method of use can provide one or more of the following features: a design that employs a minimum number of moving components to reduce wear, a simplified flexible diaphragm configuration, a valve construction that facilitates easy assembly and serviceability, and reliable performance.

BRIEF DESCRIPTIONS OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION

Figure 1:
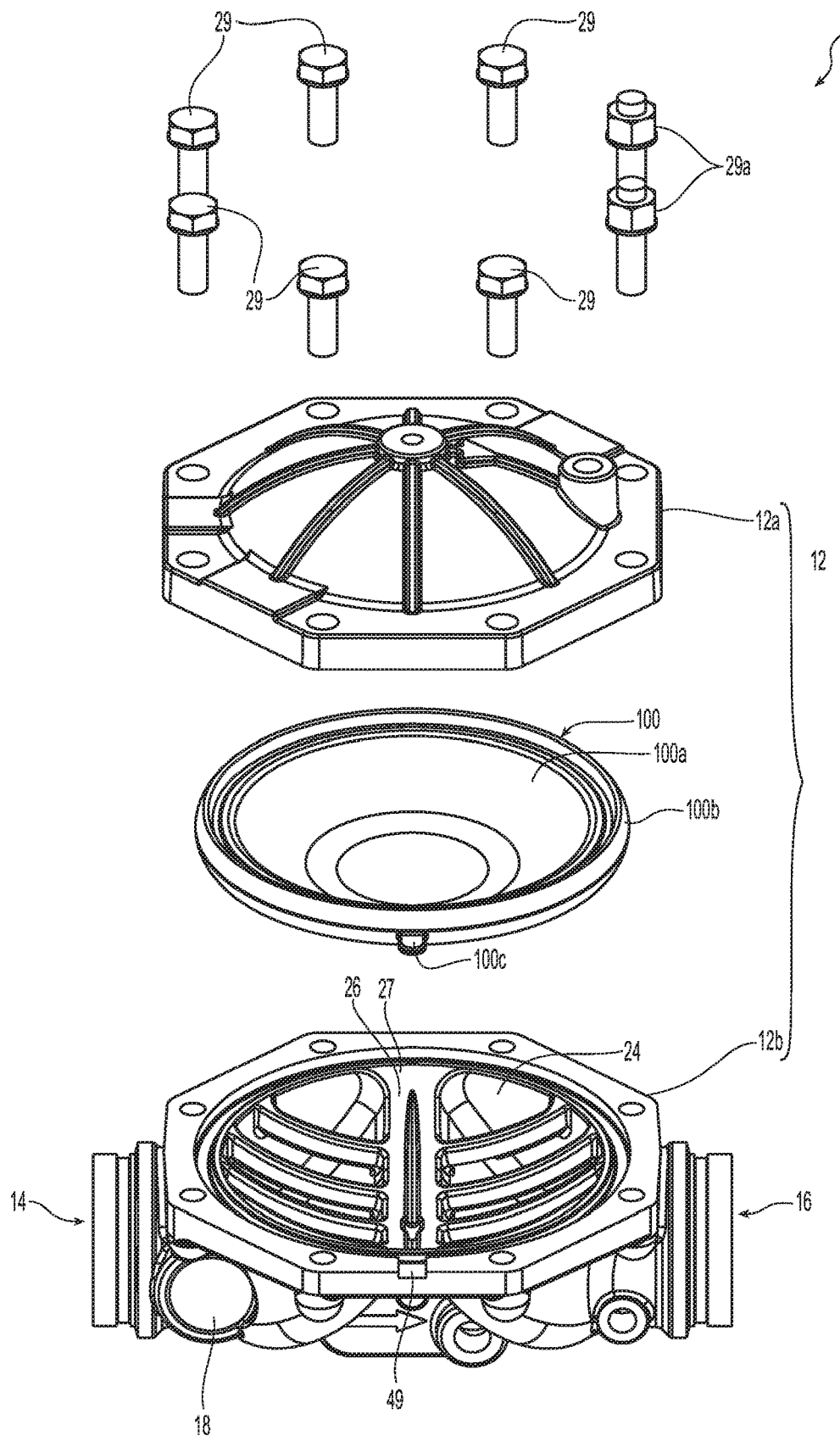
FIG. 1 is an exploded view of a preferred control valve.

Exemplary embodiments of the present invention are directed to a diaphragm-type control valve with a simplified diaphragm configuration. Shown in FIG. 1 is an exploded view of the preferred valve 10 showing the internal components of the valve 10. The valve 10 includes a valve body 12 through which fluid can flow in a controlled manner. The control valve 10 is preferably configured for installation in a piping manifold or other piping assembly to separate and control fluid flow between a first fluid volume and a second fluid volume. For example, in a fire system type application, the control valve 10 provides a diaphragm-type hydraulic control valve for preferably controlling the release and mixture of a first fluid volume having a first fluid pressure, such as for example a water main, with a second fluid volume at a second fluid pressure, such as for example, compressed gas contained in a network of pipes. Accordingly, the control valve 10 can provide fluid control between fluids or various media including liquids, gasses or combinations thereof.

The control valve 10 includes a valve body 12 preferably constructed in two parts: (i) a cover portion 12a and (ii) a body portion 12b. "Body portion" is used herein as a matter of reference to a lower portion of the valve body 12 that is coupled to the cover portion 12a when the control valve is fully assembled. Preferably, the valve body 12 and more specifically, the body portion 12b includes an inlet 14 and outlet 16. Each of the inlet and outlet 14, 16 of the valve body 12 includes an appropriate end fitting for coupling to a manifold. For example, inlet 14 preferably includes a coupling to a first fluid supply line, such as for example a water main, and the outlet 16 also preferably includes a coupling to another pipe fitting such as, for example, a discharge pipe coupled to a network of interconnected pipes. The control valve 10 can be installed in either a horizontal orientation such that fluid entering the inlet 14 at one elevation is discharged from the outlet 16 at the same elevation, or alternatively, the control valve 10 can be installed in a vertical orientation such that fluid entering the inlet at one elevation is discharged from the outlet at a different elevation.

The inlet 14, outlet 16 and valve body 12 can be sized so as to provide a range of valve sizes for coupling to corresponding nominal pipe sizes. Preferably, the inlet 14, outlet 16 and valve body 12 define valve sizes of 1 inch (25 DN) and larger and more specifically valve sizes of 1 inch (25 DN), 1½ inch (40 DN), 2 inch (50 DN), 3 inch (80 DN), 4 inch (100 DN), 6 inch (150 DN), 8 inch (200 DN), 10 inch (250 DN), and 12 inch (300 DN), which respectively accommodate nominal pipe sizes of 1 inch (25 DN), 1½ inch (40 DN), 2 inch (50 DN), 3 inch (80 DN), 4 inch (100 DN), 6 inch (150 DN), 8 inch (200 DN), 10 inch (250 DN), and 12 inch (300 DN). However, other valve sizes that accommodate other nominal pipe sizes can be provided. Preferably, in constructing the valve body 12, the cover portion 12a and the body portion 12b are separately cast and machined to provide the preferred openings and surface treatments such as threaded openings. However, other processes for construction and manufacturing can be used. The valve body 12 is preferably cast from ductile iron however other materials may be used provided they are suitable for a given fluid flow application. Preferably, a pressure rating of the valve 10 is about 300 psi (2.068 MPa).

In some embodiments, the valve body 12 can include a port 22 (see, e.g., FIG. 4C) in the valve body 12 to provide means for an alarm system monitoring the valve for any undesired fluid communication from and/or between the inlet 14 and the outlet 16. For example, the port 22 can be used for providing an alarm port to the valve 10 so that individuals can be alerted as to any gas or liquid leak from the valve body 12. More specifically, the port 22 can be coupled to a flow meter and alarm arrangement to detect the fluid or gas leak in the valve body. In addition, the port 22 is preferably open to atmosphere and, as discussed below, in communication with an intermediate chamber disposed between the inlet 14 and the outlet 16. The port 22 can include an appropriately threaded opening or other mechanical fastening member for coupling an appropriate pipe fitting or nipple to the given orifice.

As shown in FIG. 1, disposed between the cover portion 12a and the body portion 12b is a diaphragm 100. The diaphragm 100 includes a flexible preferably elastomeric member 100a, a lip member 100b that circumscribes the flexible member 100a, and a tab 100c that is used to align the diaphragm 100 in the control valve 10. The cover portion 12a and the body portion 12b each include an inner surface such that when the cover portion 12a and body portion 12b are joined together, the inner surfaces further define a chamber 24. As seen in FIG. 1, the body portion 12b preferably includes a notch 49 for receiving the tab 100c and properly aligning the diaphragm 100 within the chamber 24. In some exemplary embodiments, diaphragm 100 can have two or more tabs and the body portion 12b can have two or more corresponding notches for alignment purposes. In addition, because the bolts do not go through the diaphragm 100 to provide support, preferably pins (not shown), e.g., in the tabs or another location, can be used to hold the diaphragm 100 in place until the cover portion 12a is attached when the valve 10 is mounted vertically. The chamber 24, being in communication with the inlet 14 and the outlet 16, further defines a passageway through which a fluid, such as water, can flow. Disposed within the chamber 24 is the flexible member 100a for controlling the flow of fluid through the valve body 12. The flexible member 100a provides selective communication between the inlet 14 and the outlet 16.

Figure 2:
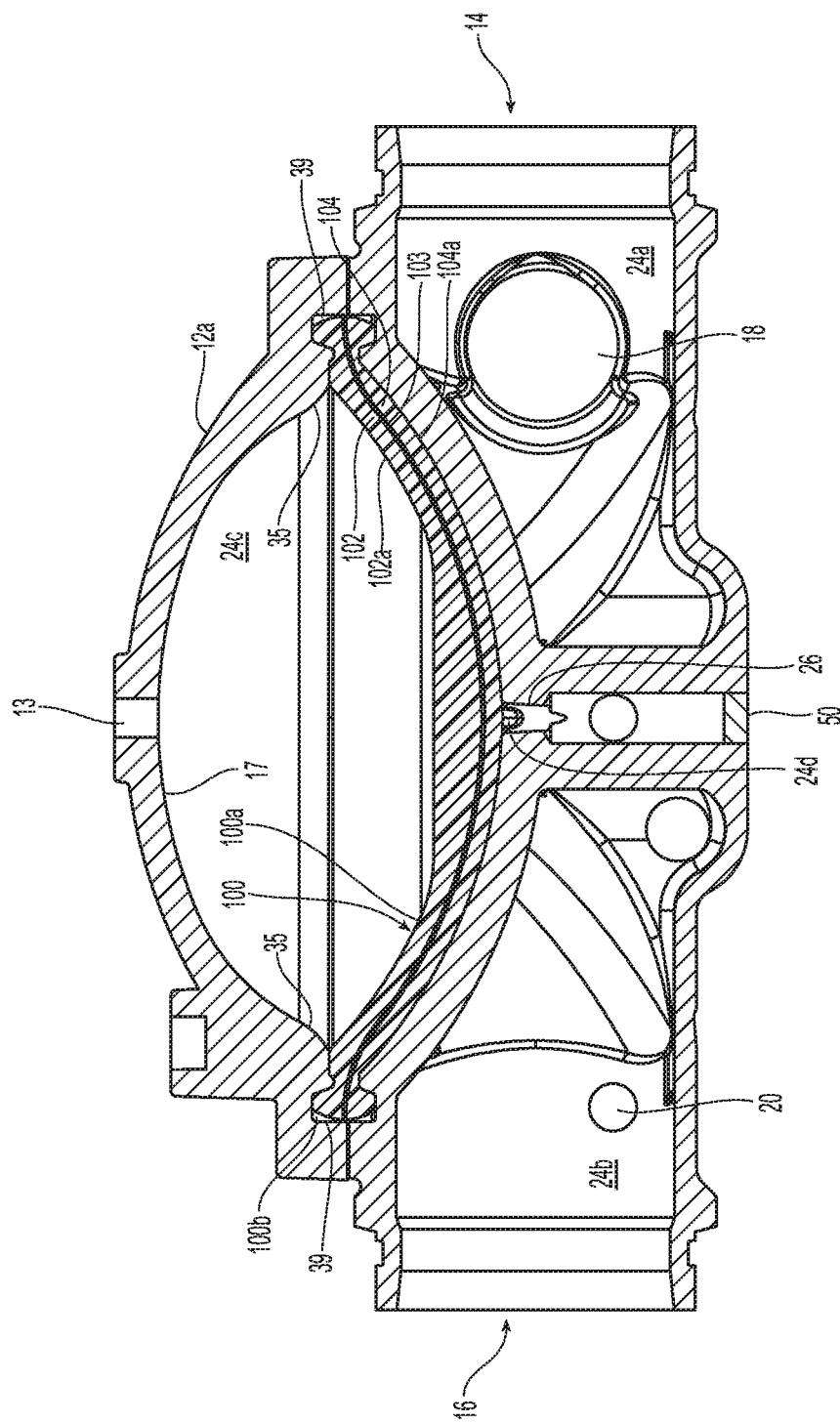
FIG. 2 is an assembled cross-sectional view of the control valve of FIG. 1 with the control valve in the closed position.
Figure 2A:
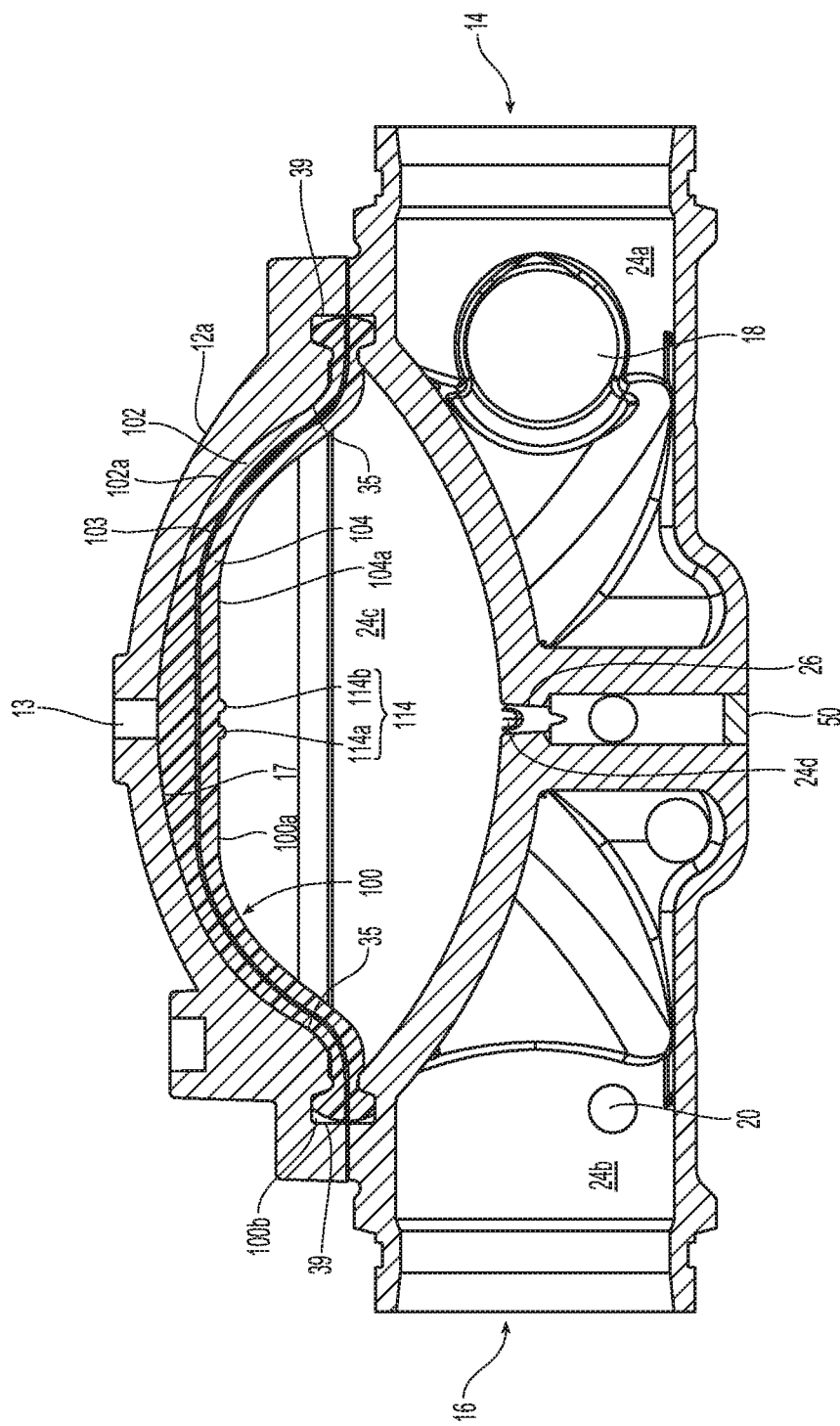
FIG. 2A is an assembled cross-sectional view of the control valve of FIG. 1 with the control valve in the open position.
Figure 4:
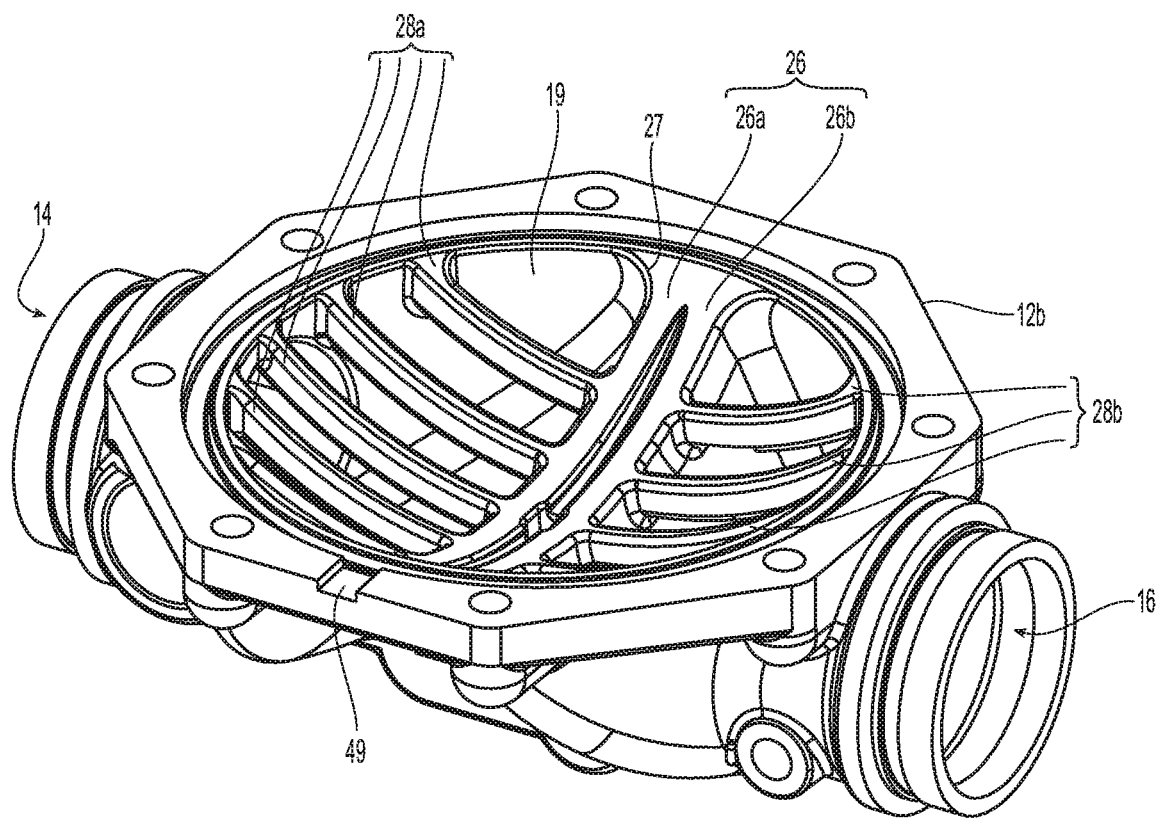
FIG. 4 is a perspective view of the lower valve body of the control valve in FIG. 1.

The diaphragm 100 has at least two positions within the chamber 24: a lower most fully closed or sealing position (see, e.g., FIG. 2) and an upper most or fully open position (see, e.g., FIG. 2A). As the diaphragm 100 moves to the upper most or fully open position, the diaphragm 100 and body portion 12b define a passageway that permits communication between the inlet 14 and the outlet 16. Preferably, at some point between the fully closed position and the fully open position, a cross-sectional area of the passageway is such that there is sufficient flow through the control valve 10 and the pressure drop in the control valve 10 is minimized. Preferably, the diaphragm 100 is constructed so as to move to the natural-inverted position. In the natural-inverted position, as seen for example in FIG. 2A, the flexible member 100a conforms to at least the profile of the central section 33 (see FIG. 5A) of the first inner surface 17 of cover portion 12a. In the lower most closed or sealing position, as seen for example in FIG. 2, the diaphragm 100 engages a seat member 26 on bridge element 27 as seen in FIG. 4, which is constructed or formed as an internal rib or middle flange within the inner surface of the valve body 12, thereby sealing off communication between the inlet 14 and the outlet 16. With the diaphragm 100 in the closed position (see FIG. 2), the diaphragm 100 preferably dissects the chamber 24 into at least three regions or sub-chambers 24a, 24b and 24c. More specifically, formed with the diaphragm 100 in the closed position is a first fluid supply or inlet sub-chamber 24a in communication with the inlet 14, a second fluid supply or outlet sub-chamber 24b in communication with the outlet 16 and a diaphragm sub-chamber 24c. The cover portion 12a preferably includes a central opening 13 for introducing an equalizing fluid into the diaphragm sub-chamber 24c. By equalizing the pressure between sub-chamber 24c and sub-chambers 24a and 24b, the tension within the diaphragm 100 (e.g., in layer 103, which is, for example, a reinforced fabric) urges the flexible member 100a to the lower position. In some embodiments, the inversion inhibitor 35, which is described below, creates a tension force within the flexible member 100a that aids in urging the flexible member 100a to the lower position. Once the diaphragm 100 makes contact with the seat member 26, the pressures are no longer equalized on each side of the flexible member 100a, and the corresponding difference in the forces holds the diaphragm 100 against seat member 26.

As seen in FIG. 2, the preferred diaphragm member 100 is configured to engage and cooperate with the inner surfaces of the cover portion 12a and body portion 12b to define the three sub-chambers 24a, 24b, 24c in an orientation that can provide for a diaphragm sub-chamber 24c that can effectively compensate for fluctuations and/or surges in fluid pressure in either one of the inlet and outlet sub-chambers 24a, 24b. Preferably, the equalizing fluid is provided from the first fluid source such that any surges in flow or pressure experienced at the inlet sub-chamber 24a is also experienced in the diaphragm sub-chamber 24c. In this manner, the diaphragm sub-chamber 24c can react and compensate with a diaphragm pressure to maintain the flexible member 100a in the lower position.

The material to be used for manufacturing the diaphragm 100 is dependent on the type of fluid being carried and on the temperature range to which the diaphragm is to be exposed. Preferably, the upper and lower layers 102, 104, respectively of the diaphragm 100 are constructed from layers of elastomeric material having a durometer hardness or shore value of about 55 to 75, and preferably about 60 to 70, and a minimum tensile strength of about 1700 pounds per square inch (psi.) (11.721 MPa). Suitable materials for use at the upper and lower layers 102, 104 include, for example, natural rubber, nitrile butadiene rubber, neoprene, ethylene propylene diene monomer (EPDM), or another appropriate elastomer. Materials that can be used for reinforcements between the upper and lower surface layers at middle layer 103 of the diaphragm 100 include a fabric made of, for example, cotton, polyester, and nylon and more preferably, nylon no. 2 reinforced material. Thus, in preferred embodiments, the diaphragm 100 includes a reinforced fabric embedded in a rubber matrix. When the diaphragm 100 is in the inverted position, the tension force is concentrated in the reinforced fabric. Preferably, two layers of reinforced fabrics are disposed at a 45 degree angle to each other with respect to a weave pattern of reinforced fabrics. By arranging the reinforced fabrics at 45 degrees to each other, the stresses on the diaphragm 100 (due to the pressure on the lower surface 104a of the flexible member 100a) are evenly distributed.

In operation, the equalizing fluid can be relieved from the diaphragm sub-chamber 24c in preferably a controlled manner to urge the diaphragm member 100 to the open or actuated position, in which the diaphragm member 100 is inverted and spaced from the seat member 26 thereby permitting the flow of fluid between the inlet 14 and the outlet 16. Preferably, the diaphragm 100 conforms to at least a portion of the inner surface 17 of the cover portion 12a. In some embodiments, the diaphragm 100 conforms to substantially the entire inner surface 17 of the cover portion 12a. The fluid release from the diaphragm sub-chamber 24c can be regulated by way of, for example, an electrically controlled solenoid valve, such that the diaphragm member 100 can achieve regulated positions between the fully closed position and the fully open position. Accordingly, the diaphragm member 100 is preferably electrically actuated between the open and closed positions. Alternatively, the diaphragm can be actuated, regulated and/or closed or latched by other mechanisms such as, for example, a mechanical latching mechanism.

Figure 3:
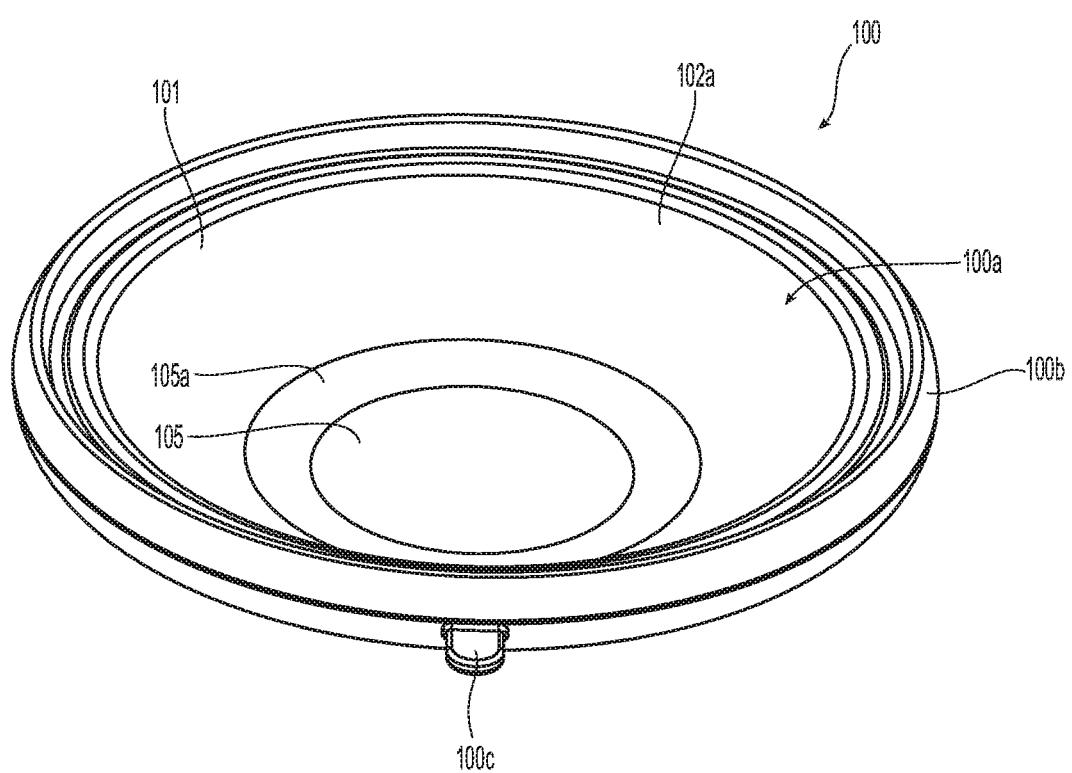
FIG. 3 is a perspective view of a preferred diaphragm for use in the control valve of FIG. 1.
Figure 3A:
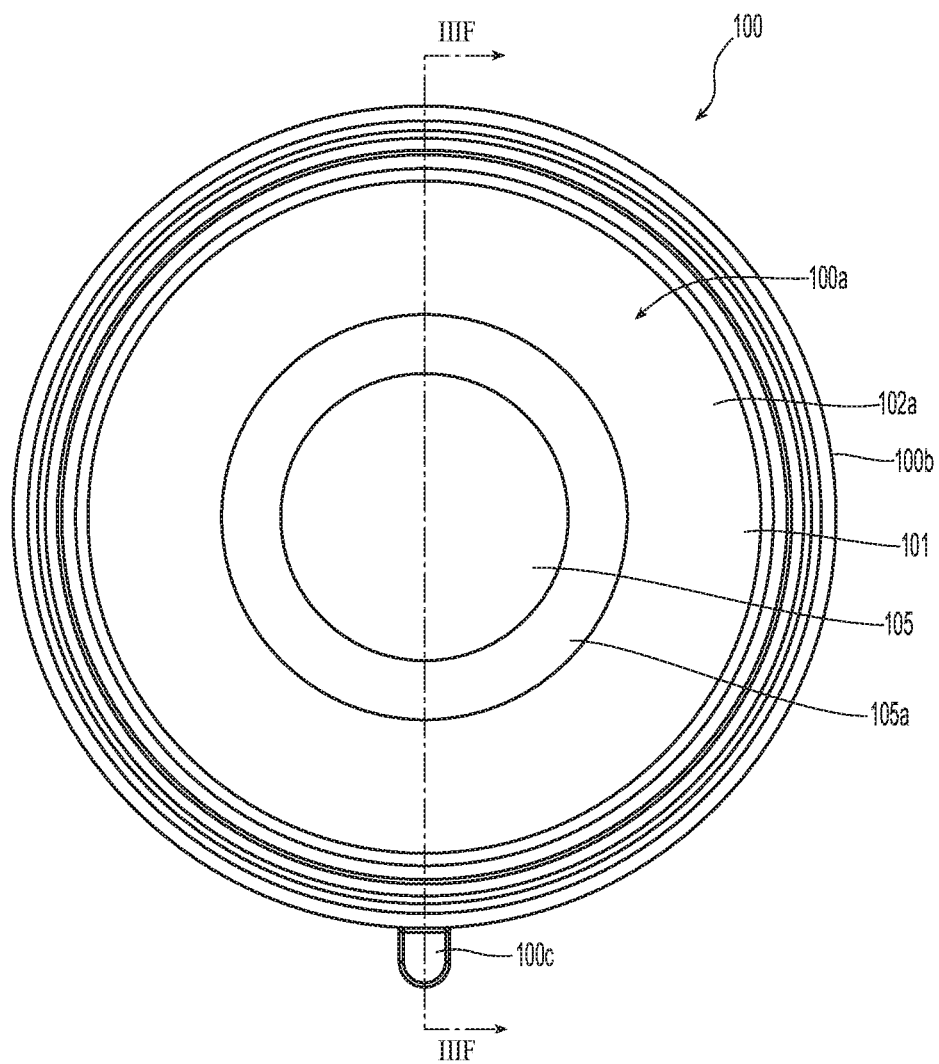
FIG. 3A is a plan-view of the upper surface of the diaphragm in FIG. 3.
Figure 3B:
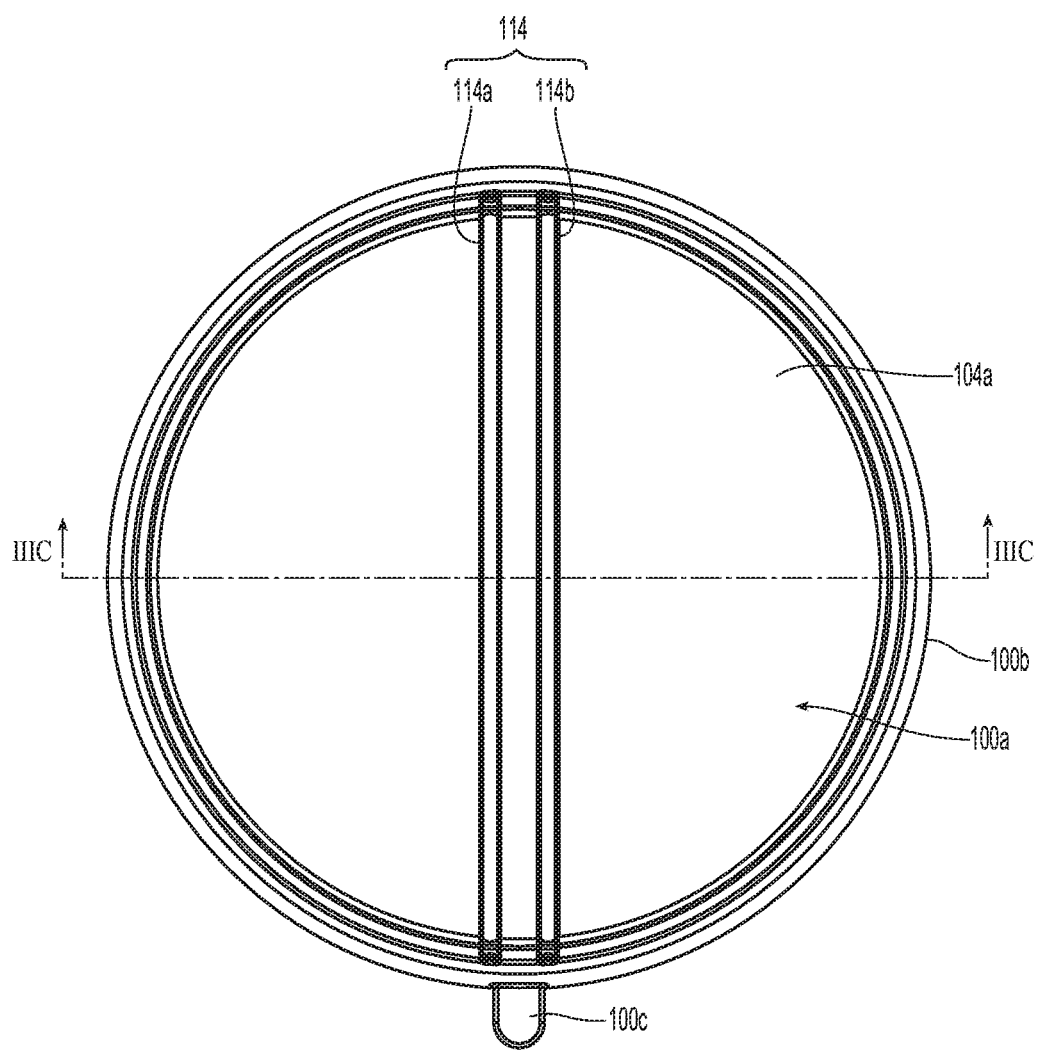
FIG. 3B is a plan-view of the lower surface of the diaphragm in FIG. 3.
Figure 3C:
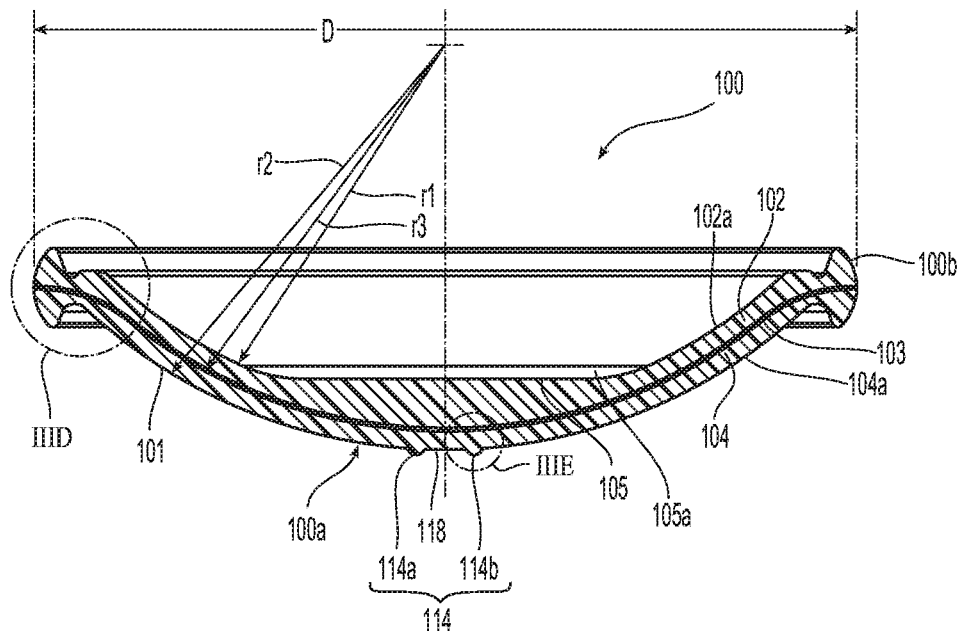
FIG. 3C is a cross-sectional view of the diaphragm along axis IIIC-HIC in FIG. 3B.
Figure 3D:
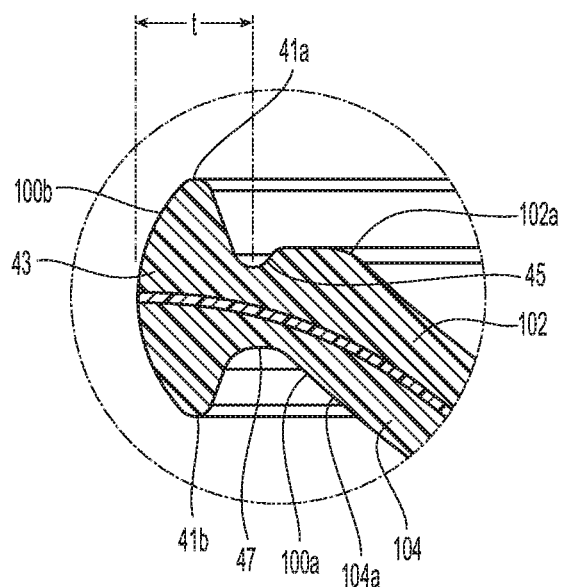
FIG. 3D is a cross-section view of the lip element in detail IIID of the diaphragm in FIG. 3C.
Figure 3E:
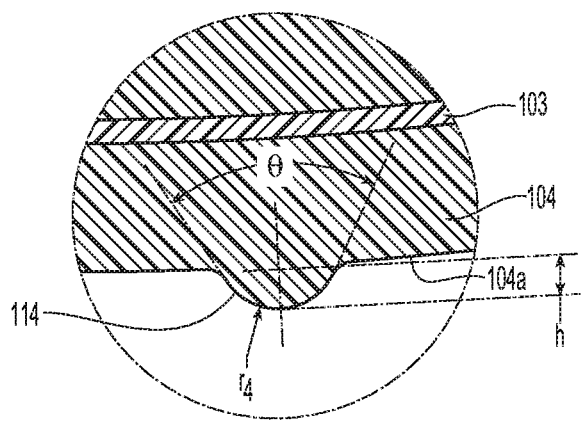
FIG. 3E is a cross-section view of the elongated member in detail IIIE of the diaphragm in FIG. 3C.
Figure 3F:
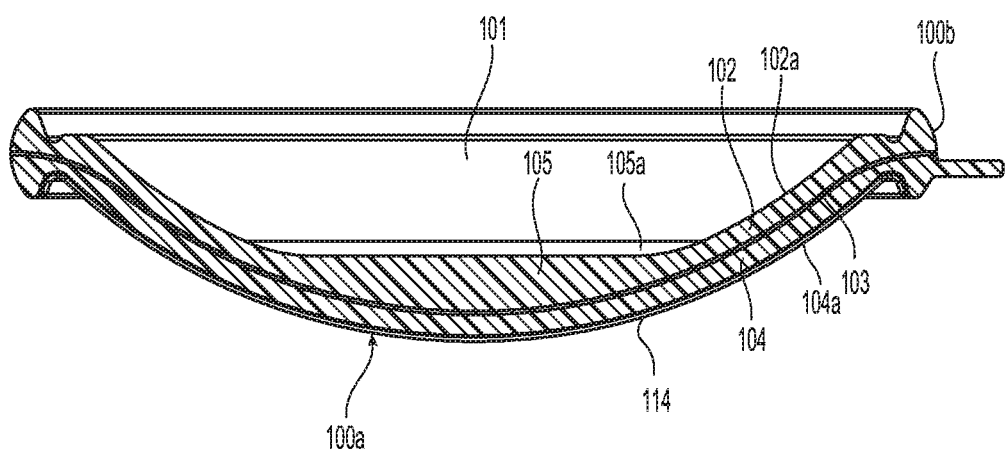
FIG. 3F is a cross-sectional view of the diaphragm along axis IIIF-IIIF in FIG. 3A.

FIG. 3 illustrates a perspective view of the diaphragm 100. As discussed above, the diaphragm 100 includes a flexible member 100a, a lip member 100b and a tab 100c. Preferably, the upper surface 102a of the flexible member 100a is a substantially smooth wall portion 101 having a constant radius of curvature. For example, the upper surface 102a can be a semi-spherical bowl. Preferably, the wall portion 101 of flexible member 100a, is elastic enough to conform to the profile of the inner surface 17 of the cover portion 12a (see FIG. 2A). Preferably, the flexible member 100a conforms to at least a portion of the inner surface 17 of the cover portion 12a. In some embodiments, the flexible member 100a conforms to substantially the entire inner surface 17 of the cover portion 12a. In some embodiments, the substantially smooth wall portion 101 extends to the bottom center of the upper surface 102a. However, in other exemplary embodiments, e.g., as illustrated in FIG. 3, the substantially smooth wall portion 101 extends part way and circumscribes a central portion 105. As best seen in FIGS. 3C and 3F, preferably, a thickness of the central portion 105 increases in a radial direction from the substantially smooth wall portion 101 to the center of flexible member 101a such that the upper surface 102a is substantially flat along the central portion 105. Preferably, a transition portion 105a provides a tapered transition from the substantially smooth wall portion 101 to the central portion 105. Although thicker than the substantially smooth wall portion 101, the central portion 105 is still elastic enough to conform to at least a portion of the inner surface 17 of cover portion 12a when the diaphragm 100 is in the inverted position. Thus, when the flexible member 100a is forced into the inverted position, the upper surface 102a of the flexible member 100a conforms to the profile of the inner surface 17 of the cover portion 12a. Preferably, the flexible member 100a conforms to substantially the entirety of the inner surface 17, which provides support for the flexible member 100a. In contrast, known diaphragms do not conform to the inner surface of the cover. Thus, known diaphragms must be made to withstand the full force of the fluid flow and pressure in the valve, which creates stress concentrations in the diaphragm. In exemplary embodiments, the cover portion 12a provides support to the flexible member 100a and thus the flexible member 100a does not have the stress concentrations experienced by known diaphragms. This means that exemplary embodiments of the diaphragm 100 of the present disclosure can be more flexible than known diaphragms. In prior art and related art valves, any internal tension force within known diaphragms, by itself, is not enough to urge the diaphragm to the lower position due to its rigidity. However, by making the diaphragm more flexible, the tension force within the diaphragm 100 is enough to urge the diaphragm 100 back to the seat member 26 without requiring an additional bias force from elements and devices such as, e.g., ribs, rings and springs. In addition, by conforming to the inner surface 17 of the cover portion 12a, the flexible member 100a maximizes the cross-sectional area of the passageway between the inlet 14 and the outlet 16. Thus, the control valves can be made smaller as compared to similarly rated prior art and related art valves.

FIGS. 3A-3F show additional features of the illustrative embodiment of the diaphragm 100. The diaphragm 100 includes an upper surface 102a and a lower surface 104a. Each of the upper and lower surface areas 102a, 104a are generally sufficient in size to seal off communication of the inlet and outlet sub-chamber 24a, 24b from the diaphragm sub-chamber 24c (see FIG. 2). The geometries of the upper and lower surface areas 102a, 104a are such that the surfaces effectively dissect and seal the chamber 24. Preferably, as seen in the plan views of FIGS. 3A and 3B, the upper and lower surface areas 102a, 104a are preferably substantially circular.

The lower surface 104a of the flexible member 100a preferably presents a substantially convex surface, and more preferably a spherical convex surface having an area AA1, and the upper surface 102a of the flexible member 100a presents a substantially concave surface, and more preferably a spherically concave surface having an area AA2. Upper surface AA2 is preferably about equal to AA1. Portions of the lower surface 104a act to seal off fluid communication from the other chambers, i.e. a portion of lower surface 104a seals the inlet sub-chamber 24a from the outlet sub-chamber 24b. The preferred geometry of the sub-chambers 24a, 24b, 24c relative to one another preferably provides that the areas sealing the inlet and outlet sub-chambers 24a, 24b are about equal, and that the inlet sub-chamber 24a is sealed off by a portion of the lower surface 104a having an area of about ½ AA1, and the outlet chamber is sealed off by a portion of the lower surface 104a having an area of about ½ AA1. In one preferred embodiment of the diaphragm 100, the upper surface 102a defines a radius of curvature $r_1$ and the lower surface 104a defines a radius of curvature $r_2$. Preferably, a ratio of the radii of curvatures between the lower surface 104a $r_2$ and the upper surface 102a $r_1$ ($r_2/r_1$) is in a range of 1.05 to 1.15. Where the diaphragm 100 includes a middle layer 103, the middle layer 103 can further define a third radius of curvature $r_3$, which is between $r_1$ and $r_2$. The various radii of curvatures can be measured from a common central point. The ratio of the radius of curvature of a lower surface 104a to the radius of curvature of an upper surface 102a is preferably sufficient to permit the lower surface 104a to engage the seat member 26 of bridge element 27 when the diaphragm 100 is in the lower position and adequately seal off the inlet and outlet sub-chambers 24a, 24b. Preferably, a thickness of the flexible member 100a can be in a range of 0.30 inch (7.62 mm) to 1.0 inch (25.4 mm) and, more preferably, in a range of 0.40 inch (10.16 mm) to 0.80 inch (20.32 mm).

Preferably, the radius of curvature $r_2$ of the lower surface 104a and a radius of curvature $r_5$ of the seat member 26 of the bridge element 27 (see FIG. 4C) are corresponding radius of curvatures such that the flexible member 100a conforms to and seals against the elongated seat member 26 when the flexible member 100a is in the non-inverted position (lower position). Preferably, the lower surface 104a of the flexible member 100a further includes at least one elongated sealing member or projection 114 to aid in forming a sealed engagement between flexible member 100a and the seat member 26 of the bridge element 27. Preferably, as shown in FIG. 3B, the diaphragm 100 includes a pair of elongated sealing members or projections 114a, 114b. Each of the elongated sealing members 114a, 114b further aids in forming the sealed engagement between flexible member 100a and the seat member 26 of the bridge element 27. The sealing members 114a, 114b preferably extend in a parallel fashion along the lower surface 104a for a length about equivalent to the maximum arc length defined by the surface 104a. The elongated sealing members 114a, 114b each have a geometric profile that provides a sealing function and can have a profile such as, e.g., a semicircular cross-sectional profile, a semi-ellipse cross-sectional profile, a semi-oval shape cross-sectional profile, or any other cross-sectional profile that provides the sealing function discussed herein. Preferably, as seen in FIG. 3E, each of the elongated sealing members 114a, 114b preferably defines a protruding cross-sectional area having a radius of curvature $r_4$ in a range of about 0.05 inch (1.27 mm) to 0.20 inch (5.08 mm) with tangents of the sidewalls at the interface to the lower surface 104a forming an angle θ in a range of 55 degrees 65 degrees.

A height h of the elongated sealing members 114a, 114b is in a range of 0.04 inch (1.016 mm) to 0.12 inch (3.048 mm).

As seen in FIG. 3C, the sealing members 114a, 114b are preferably spaced apart so as to define a void or channel 118 therebetween. The sealing members 114a, 114b along with a portion of the lower surface 104a disposed therebetween further define the sidewalls of the void or channel 118 and its channel height. The sealing members 114a, 114b are configured to engage the seat member 26 of the bridge element 27 when the diaphragm is in the closed position so as to seal off communication between the inlet 14 and the outlet 16 and more specifically seal off communication between the inlet sub-chamber 24a and the outlet sub-chamber 24b. Preferably, in some embodiments, the sealing members 114a, 114b engage the seat member such that the channel 118 cooperates with the seat member 26 to form an intermediate chamber 24d to axially space the inlet sub-chamber 24a and the outlet sub-chamber 24b in a manner described in greater detail herein below. Although the exemplary embodiment is described with two sealing members, 114a, 114b, the lower surface 104a of the diaphragm 100 can include just one sealing element or more than two sealing elements provided that each sealing element cooperates with the seat member 26 in a sealing fashion.

Figure 4A:
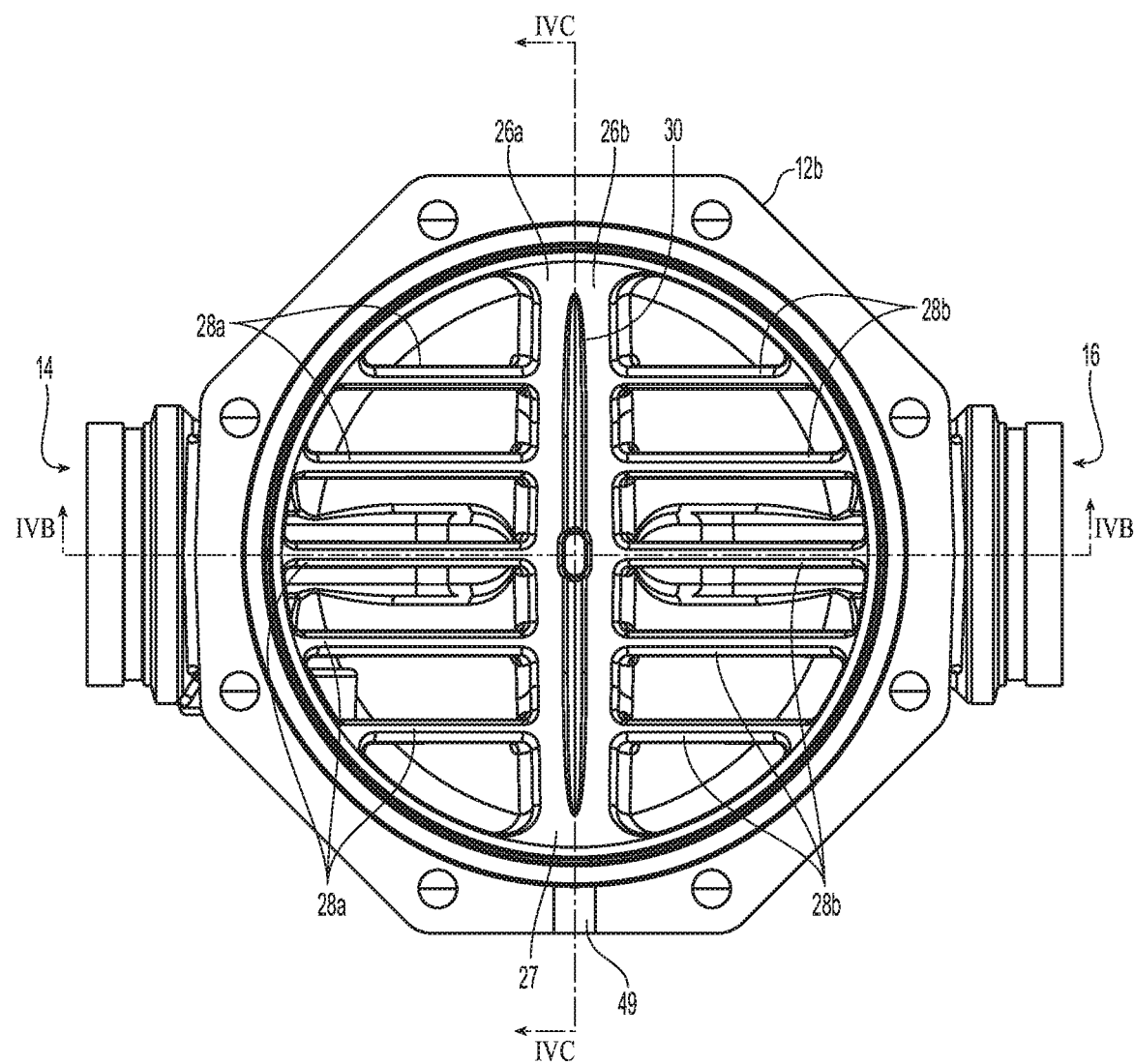
FIG. 4A is a top plan-view of the lower valve body in FIG. 4.

FIG. 4 shows a perspective view of the body portion 12b. The inner surface 19 of the body portion 12b includes a bridge element 27. The bridge element 27 includes a valve seat member 26. As seen in FIG. 4A, the body portion 12b preferably defines a valve axis IVB-IVB. The inlet and outlet 14, 16 of the control valve 10 are preferably centered about, coaxial with and spaced apart along the valve axis IVB-IVB. The body portion 12b further preferably defines an axis IVC-IVC which is substantially orthogonal to the axis IVB-IVB. Preferably aligned with the axis IVC-IVC is the bridge element 27 extending the width of the body portion 12b so as to effectively divide the chamber 24 in the body portion 12b into the preferably spaced apart and preferably equal sized sub-chambers, e.g., the inlet sub-chamber 24a and the outlet sub-chamber 24b. The body portion 12b also includes one or more support members 28a,b that are respectively connected to each side of the bridge element 27. The support members 28a,b preferably extend from the flanges of the inlet and outlet 14, 16 to intersect the bridge element 27. The support members 28a,b are disposed in a direction that is substantially parallel to the first axis IVB-IVB, i.e., perpendicular to the bridge element 27. Preferably, each side of the bridge element 27 can have a plurality of support members 28a,b, with the number of support members 28a,b being based on the size of the valve 10 and/or the pressure rating of the valve 10. Preferably, the bridge element 27 has 3 to 21 support member 28a,b, more preferably 3 to 11 support member 28a,b, and even more preferably 5 to 9 support members 28a,b. In the exemplary embodiment of FIG. 4A, there are five support members 28a,b on the respective sides of bridge element 27. Of course, exemplary embodiments can have fewer than three or more than eleven depending on design criteria such as pressure drop across the valve 10. In addition, the number of support members 28a,b on each side need not be the same. For example, the body portion 12b can have five support members 28b and only three support members 28a or some other combination depending on the needs of the system. The support members 28a,b preferably form a unitary construction with the bridge element 27 and the rest of the body portion 12b, or alternatively, the support members 28a,b can be joined to the bridge element 27 and the body portion 12b by other joining techniques such as, for example, welding.

The surface of the seat member 26 of bridge element 27 preferably defines an arc having an arc length to mirror the convex surface of the lower surface 104a of the diaphragm 100. For example, the radius $r_5$ (see FIG. 4C) and the radius $r_2$ (see FIG. 3C) are corresponding radius of curvatures. In addition, the arc length corresponding to the surface of seat member 26 is substantially equal to the arc length corresponding to the lower surface 104a of flexible member 100a. Further, the surface of each of the support members 28a,b preferably defines an arc that mirrors the convex surface of the lower surface 104a of the flexible member 100a. For example, the radius $r_6$ (see FIG. 4B) corresponding to the surface of each support member 28 and the radius $r_2$ (see FIG. 3C) corresponding to the lower surface 104a of flexible member 100a are corresponding radius of curvatures. By having the radii $r_6$, $r_5$ substantially match the radius $r_2$, the spherical surface profile of the combined structure of the support members 28a,b and bridge element 27 substantially matches the profile of the lower surface 104a. Thus, the load from the lower surface 104a when the diaphragm 100 is in the lower position will be spread substantially evenly over an area formed by the surfaces of support members 28a, b and the surface of bridge element 27. By spreading the load, the stress concentrations in the flexible member 100a are minimized when the flexible member 100a is in the closed position. In some prior art and related art systems, support members do not exist or are offset from the valve seat such that the support members and the valve seat are not on the same spherical surface. This means that the diaphragm must be designed to handle the load created by the pressure chamber with little or no support from additional valve structures. This leads to a more rigid diaphragm construction and the associated problems discussed above. In exemplary embodiments of the present disclosure, the support members 28a,b and bridge element 27 provide support such that the flexible member 100a can be more elastic. As discussed above, a more elastic flexible member 100a allows for a diaphragm configuration in which basing elements such as ribs and springs can be eliminated.

Preferably, in some embodiments, extending along the preferred arc length of the bridge element 27 is a groove or channel 30 constructed or formed in the surface of the seat member 26. The groove 30 preferably extends the full length of the seat member 26 so as to extend the width of the body portion 12b. Furthermore, the groove 30 preferably tapers narrowly at its ends. In addition, the walls of the seat member 26 that define the groove 30 are preferably parallel. Alternatively, the groove 30 can be formed such that the walls forming the groove 30 are angled relative to one another, another reference line or other surface in the valve body 12. The bottom of the groove 30 preferably forms a semi-circular arc in the plane perpendicular to the direction of elongation for the groove 30. Other geometries are possible provided the channel 30 delivers the desired fluid and hydraulic characteristics for the appropriate exemplary embodiments as described herein. Moreover, the depth of the groove 30 can vary along its length such that the groove 30 is preferably deepest at its center and becomes more shallow toward its lateral ends. The groove 30 further bisects the engagement surface of the seat member 26 preferably evenly along the seat member length. When the diaphragm member 100 is in the closed positioned, the elongated sealing members 114a, 114b are preferably aligned to engage the bisected surface of the seat members 26. Preferably, engagement of the sealing members 114a, 114b with the engagement surfaces 26a, 26b of the seat member 26 further places the channel 118 of the diaphragm 100 in communication with the groove 30.

As seen in FIG. 4A, preferably, the engagement surfaces 26a, 26b of the seat member 26 are substantially planar. Generally, the surfaces 26a, 26b are configured sufficiently wide over their entire length so as to maintain sealing contact with the lower surface 104a of flexible member 100a. Preferably, the surfaces 26a, 26b are configured wide enough so as to maintain sealing contact with sealing members 114a, 114b regardless of any movement of the sealing members 114a, 114b along the longitudinal axis IVB-IVB. Accordingly, the surfaces 26a, 26b can maintain sealed engagement with the lower surface 104a, which preferably includes sealing members 114a, 114b, despite changes in fluid pressure in either the inlet or outlet sub-chamber 24a, 24b which can impose forces on the flexible member 100a and sealing members 114a, 114b in a direction along the axis IVB-IVB.

Figure 4B:
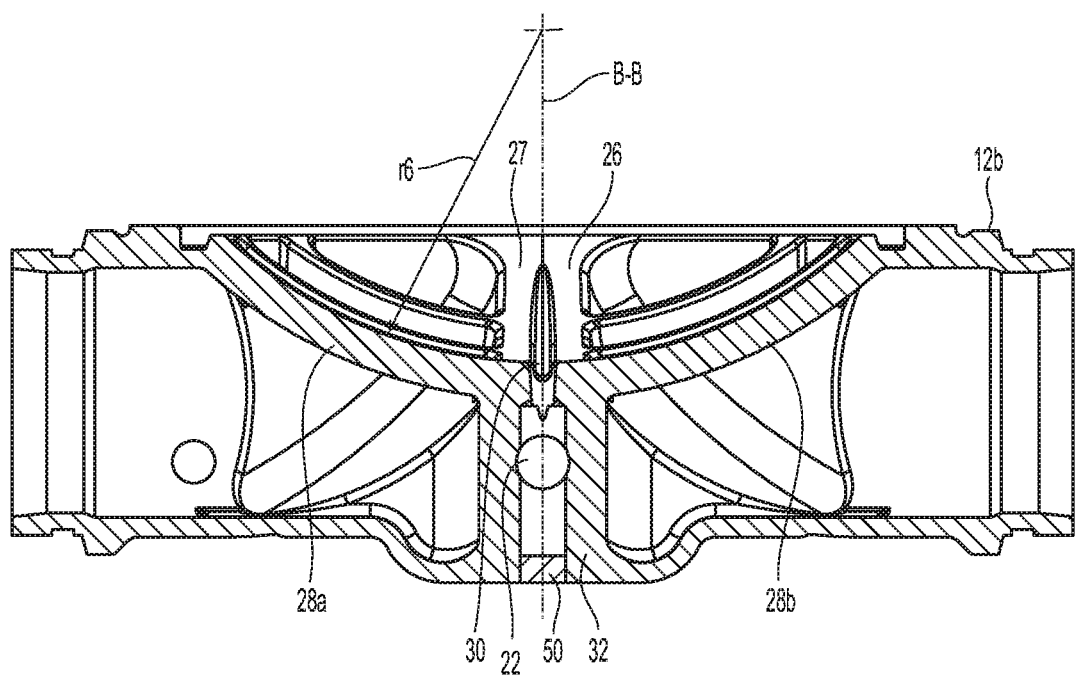
FIG. 4B is a cross-sectional view of the lower valve body along axis IVB-IVB in FIG. 4A.
Figure 4C:
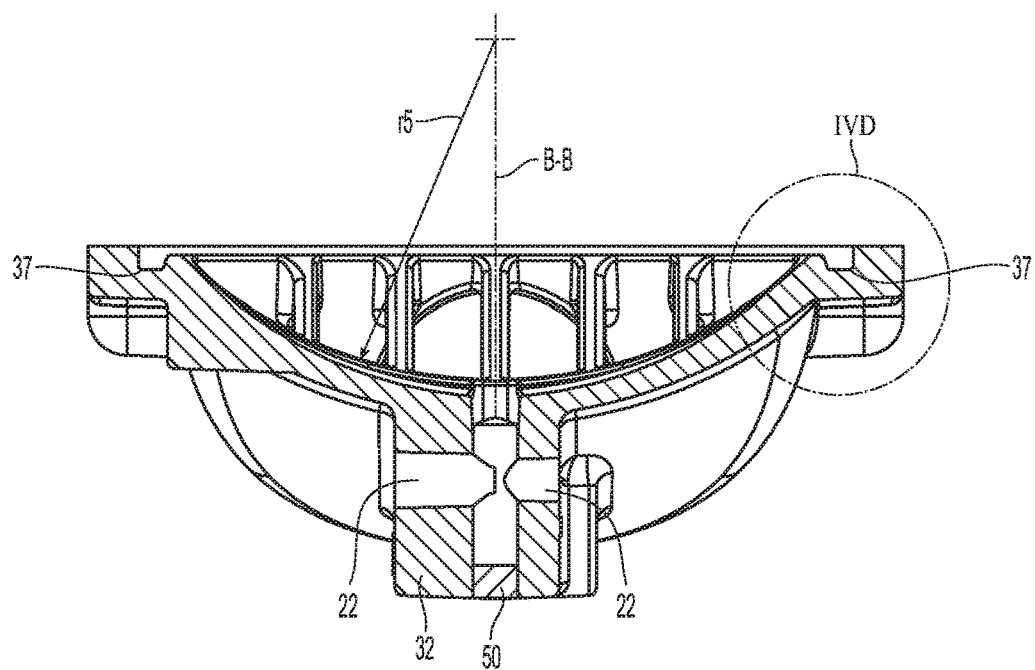
FIG. 4C is a cross-sectional view of the lower valve body along axis IVC-IVC in FIG. 4A.

As seen in FIG. 4B, the bridge element 27 is preferably formed with a central base member 32 that further separates and preferably spaces the inlet and outlet sub-chambers 24a, 24b and diverts fluid in a direction between the diaphragm 100 and the seat member engagement surfaces 26a, 26b. As seen, for example, in FIGS. 4B and 4C, the base member 32 is preferably broader in the direction along the axis IVB-IVB than along the axis IVC-IVC. The base member 32 is preferably substantially aligned with the central axis B-B of the valve body 12 which intersects substantially orthogonally the plane formed by the intersection of the axis IVB-IVB and the axis IVC-IVC. In some embodiments, a port 22 is formed in the base member 32 between inlet sub-chamber 24a and outlet sub-chamber 24b. The drain 18 diverts the first fluid, water from a water main, entering the valve 10 through the inlet 14 to outside the valve body 12. The input opening 20 can be used to introduce the second fluid, e.g., compressed gas, into the valve body 12 for discharge out the outlet 16.

The port 22 is preferably constructed as an alarm port from one or more voids formed in the base member 32. The port 22 preferably extends substantially perpendicular to a central axis B-B so as to intersect and be in communication with a channel that extends to the groove 30. After the port 22 is constructed, the channel can be plugged using plug 50. Accordingly, when the diaphragm member 100 is in the closed position, the port 22 is further preferably in sealed communication with the channel 118 formed in the diaphragm member 100. Alternatively or in addition to the port 22, in some embodiments, the plug 50 can be removed and the channel can be used as an alarm port.

The communication between the diaphragm channel 118, the groove 30 and the port 22 is preferably bound by the sealed engagement of the sealing members 114a, 114b with the seat member surfaces 26a, 26b, to thereby define a preferred fourth chamber, intermediate chamber 24d, as seen, for example, in FIG. 2. The intermediate chamber 24d is preferably open to atmosphere thereby further defining a fluid seat, preferably an air seat, to separate the inlet and outlet sub-chambers 24a, 24b. Providing an air seat between the inlet and outlet sub-chambers 24a, 24b allows each of the inlet and outlet chambers to be filled and pressurized while avoiding failure of the sealed engagement between the sealing member 114 and the seat member 26. Because each sealing member 114 is acted upon by a fluid force on only one side of the element and preferably atmospheric pressure on the other, the fluid pressure in the diaphragm sub-chamber 24c is effective to maintain the sealed engagement between the sealing member 114 and the seat member 26 during pressurization of the inlet and outlet sub-chambers 24a, 24b.

Figure 2B:
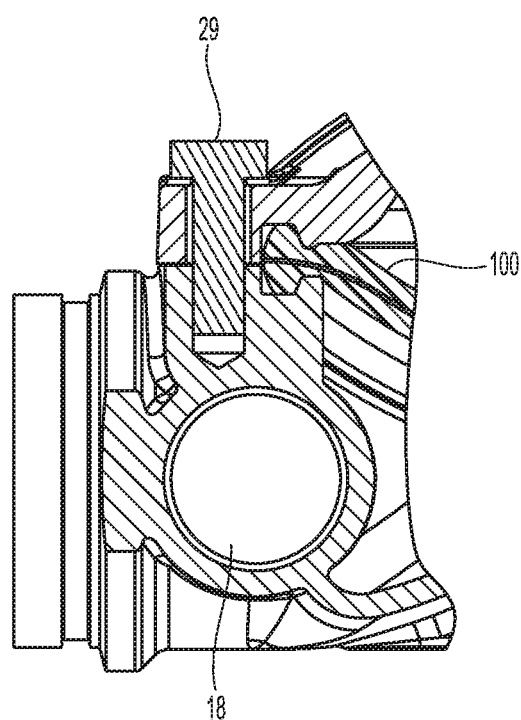
FIG. 2B is an assembled cross-sectional view of a bolt detail of the control valve in FIG. 1
Figure 5:
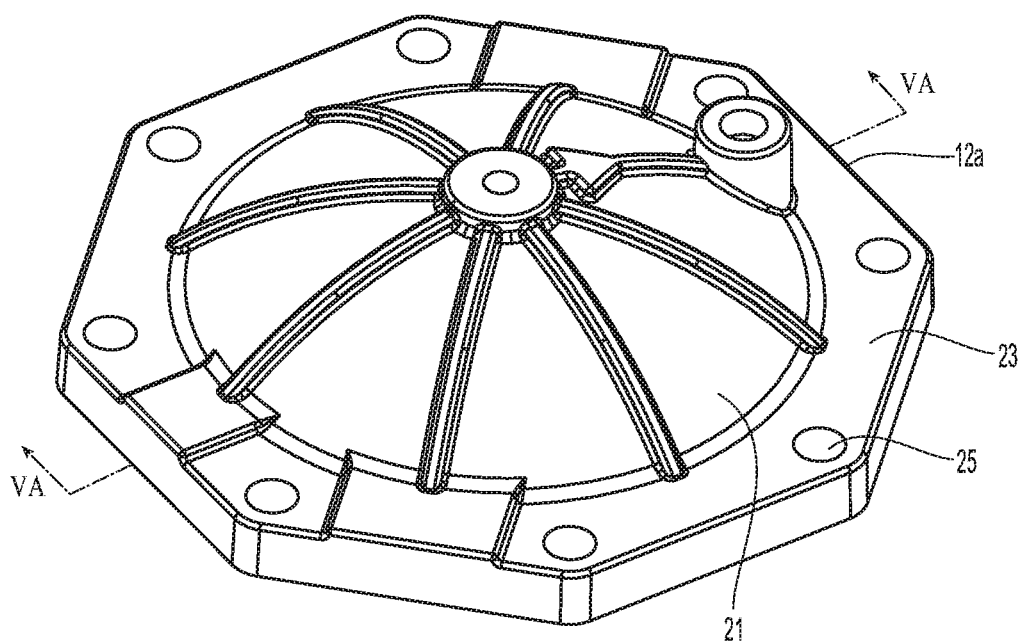
FIG. 5 is a perspective view of the cover of the control valve in FIG. 1.

FIG. 5 is a perspective view of the cover portion 12a. The cover portion 12a includes a dome section 21 and a flange section 23. Preferably, the flange section 23 includes a plurality of bolt holes 25 to receive bolts 29 or threaded studs 29a (see FIG. 1). The threaded studs 29a facilitate the assembly of the cover portion 12a when the valve 10 is mounted in a vertical position. For example, the cover portion 12a can be hung on the threaded studs 29a while the bolts 29 are inserted in the remainder of the holes 25. The cover portion 12a and the body portion 12b are preferably coupled together by a plurality of bolts distributed in a bolt pattern about the body 12. A preferred bolt pattern includes eight bolt/nut assemblies. In an alternative bolt assembly, a threaded stud assembly or a combination of both bolts and threaded studs can be utilized. Preferably, the bolt or threaded stud pattern is disposed on the valve body 12 such that the bolts do not penetrate diaphragm 100. That is, the bolts and/or threaded studs are disposed outside the outer perimeter of diaphragm 100 as seen in FIG. 2B.

Figure 5A:
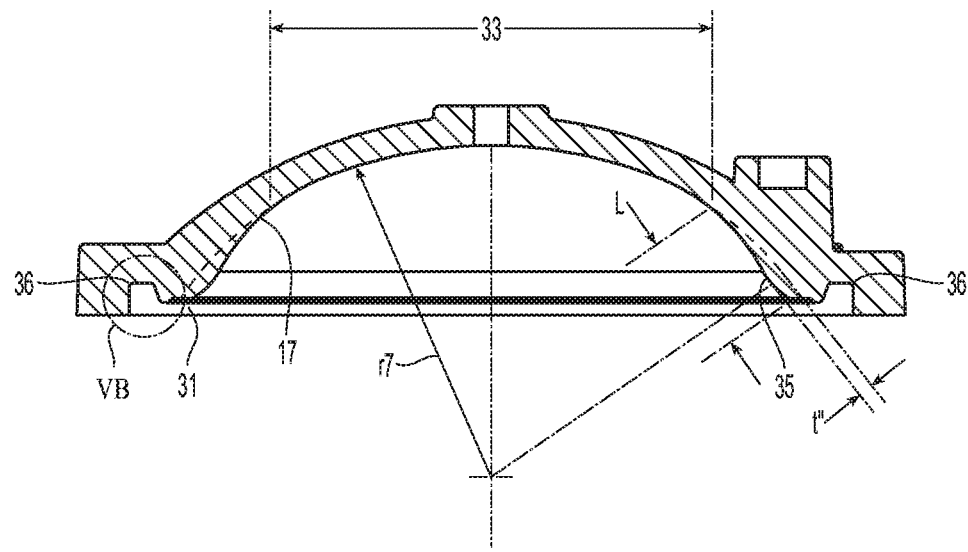
FIG. 5A is cross-sectional view of the cover along axis VA-VA in FIG. 5.

As seen in FIG. 5A, an inside surface 17 of the cover portion 12a has a dome-shaped profile that permits the flexible member 100a to conform to the inside surface 17. Preferably, the dome-shaped profile has a radius $r_7$ with respect to a point on the centerline of the cover portion 12a. Preferably, the dome-shaped profile extends to the edge 31 (see dotted line in FIG. 5A) of the cover portion 12a at the interface to the diaphragm 100. By extending the dome-shaped profile to the edge 31, the cover portion 12a does not prevent the flexible member 100a from fully inverting, e.g., does not prevent the flexible member 100a from reaching its natural-inverted position.

However, in some embodiments, as seen in FIG. 5A, the dome-shaped profile is limited to a central section 33 of the cover portion 12a and an inversion inhibitor 35 extends from the cover portion 12a, near the edge 31. The inversion inhibitor 35 prevents the flexible member 100a from reaching its natural-inverted position by blocking the flexible member 100a. Although the flexible member 100a can conform to the inner surface 17 of the cover portion 12a, including the inversion inhibitor 35, the flexible member 100a does not fully invert (e.g., does not reach its natural-inverted position) as in a case where the cover portion 12a does not include an inversion inhibitor 35. By blocking the full inversion of the flexible member 100a, the inversion inhibitor 35 creates a tension force within the flexible member 100a that urges the flexible member 100a to the seat member 26.

As seen in FIG. 5A, when compared to the surface profile of central section 33, the surface profile of the inversion inhibitor 35, which circumscribes the central section 33, projects into the chamber 24 toward the central axis of the cover portion 12a. The projection into the chamber 24 by the inversion inhibitor 35 blocks the full inversion of the flexible member 100a. The inversion inhibitor 35 can be, for example, a bulge or protruding section on the inner surface of the chamber 24. Preferably, as shown in FIG. 5A, the inversion inhibitor 35 is a deviation of the inner surface 17 from a surface curvature defined by radius $r_7$ (see deviation from dotted line in FIG. 5A). Preferably, deviation of the inner surface 17 is greatest near the edge 31 adjacent to the diaphragm 100 when the control valve 10 is assembled and the deviation gradually decreases to zero, i.e., the inner surface profile matches the surface profile corresponding to the radius $r_7$, in a direction towards the central section 33.

Preferably, a maximum thickness t" of the inversion inhibitor 35, as measured in a radial direction from the surface of the inversion inhibitor 35 towards a surface corresponding to radius $r_7$, is in a range of 0.10 inch (2.54 mm) to 0.70 inch (17.78 mm). Preferably, the inversion inhibitor 35 has a length L that is in a range of 0.5 inch (12.7 mm) to 4.5 inch (114.3 mm) as projected on a plane that is perpendicular to the radius $r_7$ at the maximum thickness t" of the inversion inhibitor 35.

In some embodiments, the inversion inhibitor 35 defines a substantially rounded cross-sectional profile. For example, the cross-sectional profile can be a substantially semicircular profile, substantially a semielliptical profile with respect to a major axis or a minor axis, a substantially triangular-shaped profile, or any other profile that can provide a bias force on the flexible member 100a to urge or aid in urging the flexible member 100a to the seat member 26. Preferably, as seen in FIG. 5A, the inversion inhibitor 35 at edge 31 adjacent to the diaphragm 100 is curved such that the cross-sectional profile is substantially a semi-tear drop shaped profile. In the direction from the central section 33 to the edge 31, the tear-drop profile provides for a gradual increase in the deviation of the inner surface 17 from the line corresponding to radius $r_7$. By gradually increasing the deviation, the flexible member 100a can still conform to the inner surface 17 of cover portion 12a when the flexible member 100a is in the inverted position. In some embodiments, along with the tension force in the layer 103 of diaphragm 100, the inversion inhibitor 35 can create a tension force within the flexible member 100a to aid in urging the flexible member 100a to the seat member 26 as discussed above.

Figure 4D:
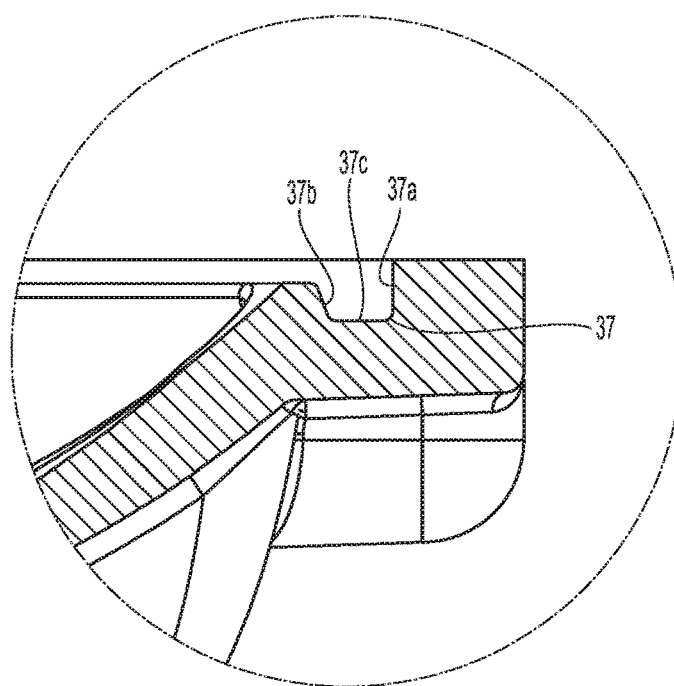
FIG. 4D is a cross-sectional view of the channel feature in detail IVD of FIG. 4C.
Figure 4E:
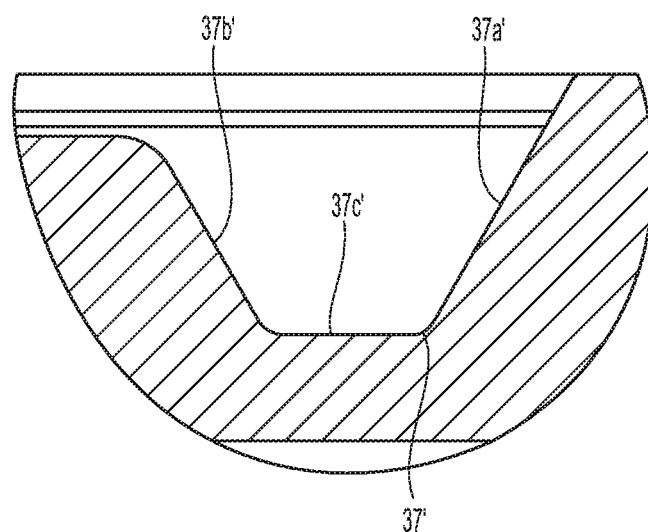
FIG. 4E is a cross-sectional view of another embodiment of a channel feature for the body portion.
Figure 5B:
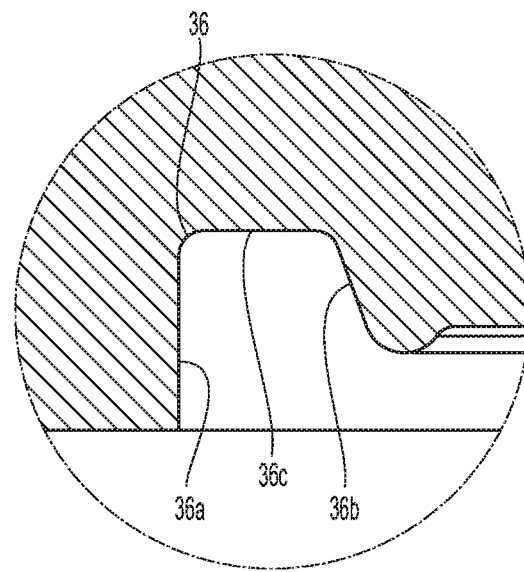
FIG. 5B is a cross-sectional view of the channel feature in detail VB of FIG. 5A.
Figure 5C:
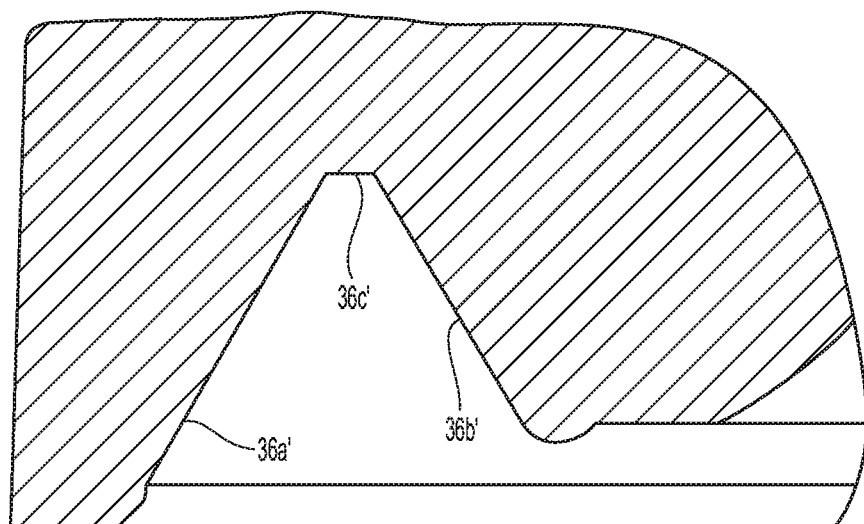
FIG. 5C is a cross-sectional view of another embodiment of a channel feature for the cover portion.

As discussed above, lip element 100b of diaphragm 100 circumscribes the flexible member 100a. As seen in FIGS. 4D and 5B, preferably, the cover portion 12a and the body portion 12b each include a channel 36, 37, respectively, that circumscribes the chamber 24. When the cover portion 12a and the body portion 12b are joined together, the channels 36 and 37 define a cavity 39 (see FIG. 2) for receiving the lip member 100b. Each channel 36, 37 includes an outer radial wall 36a, 37a, respectively, and an inner radial wall 36b, 37b, respectively. The inner radials walls 36b, 37b are shorter in length than the outer radial walls 36a, 37a, respectively, such that when assembled, a gap is formed that provides a passage from the cavity 39 to the chamber 24. In the embodiments of FIGS. 4D and 5B, the channels 36 and 37 have profiles that are substantially square but with the inner radial walls 36b and 37b disposed at a slight angle with respect to a normal to the channel base 36c, 37c. In other embodiments, for example, as seen in FIGS. 4E and 5C, the channels 36' and 37' have profiles that are substantially trapezoidal in shape with both the outer radial walls 36a', 37a' and the inner radial walls 36b', 37b' are at an angle with respect to a normal to the channel base 36c', 37c'. The shape and dimensions of the channels will depend on the pressure rating of the valve 10 and/or the geometry of the valve 10. For example, the channel shape and dimension can be configured to limit any obstruction to the inlet 14 and outlet 16 of valve 10. Preferably, the shapes and dimensions of the corresponding channels between the cover portion 12a and the body portion 12b are substantially the same, for example, as seen in FIGS. 4D and 5B. However, in some embodiments the shapes and dimensions can be different. For example, as seen in FIGS. 4E and 5C, the base of channel 36c' is narrower than the base of channel 37c'.

The diaphragm 100 is disposed between the cover portion 12a and the body portion 12b. When the control valve 10 is assembled, the cavity 39 engages the lip member 100b of the diaphragm 100 such that the channel 36 of cover portion 12a and the channel 37 of the body portion 12b pinch the lip member 100b to securely hold the diaphragm 100. Because the lip member 100b is secured, when the flexible member 100a is inverted as discussed above, a tension force is created in layer 103 of the diaphragm 100.

In preferred embodiments, the diameter of the circle defining cavity 39 is smaller than the diameter of the circle defining the bolt pattern for bolts 29 and/or threaded studs 29a. In this way, the bolts 29 and/or threaded studs 29a are disposed on the valve body 12 such that the bolts/threaded studs do not penetrate diaphragm 100. That is, the bolts and/or threaded studs are disposed outside the outer perimeter of lip member 100b of diaphragm 100 as seen in FIG. 2B. By disposing the bolts/threaded studs outside the circumference of diaphragm 100, the diaphragm 100 in preferred embodiments does not have any holes and thus does not experience the high stress concentrations that known diaphragms (in which the bolts go through the diaphragm) experience around the holes during the open/close cycles of the valve.

Preferably, the lip element 100b forms a seal between the chamber 24 and the outside atmosphere that can withstand the operating pressure of the control valve 10 when the valve 10 is assembled and in operation. The cross-sectional profile of the lip element 100b can be a semicircle-shaped cross-section, an elliptical-shaped cross-section or any other cross-sectional profile so long as the lip member 100b provides the requisite seal. For example, FIGS. 3C and 3D illustrate a preferred configuration of the lip member 100b. The lip member 100b is received by the cavity 39. The lip member 100b preferably has a substantially oval-shaped cross-section 43. Preferably, the oval-shaped cross-section 43 has a flattened profile on a side adjacent to the flexible member 100a. The oval-shaped cross-section 43 includes two endpoints 41a, 41b that respectively engage the upper surface 17 of the cover portion 12a in channel 36 and the lower surface 19 of the body portion 12b in channel 37. Preferably, the thickness t of the lip member 100b is in a range of 0.60 inch (15.24 mm) to 1.2 inches (30.48 mm), and more preferably 0.9 inch (22.86 mm) to 1.1 inches (27.94 mm). When secured, the two endpoints, which are composed of a rubber or elastic material, are pinched in the cavity 39 and deformed so as to seal the control valve 10.

Figure 3G:
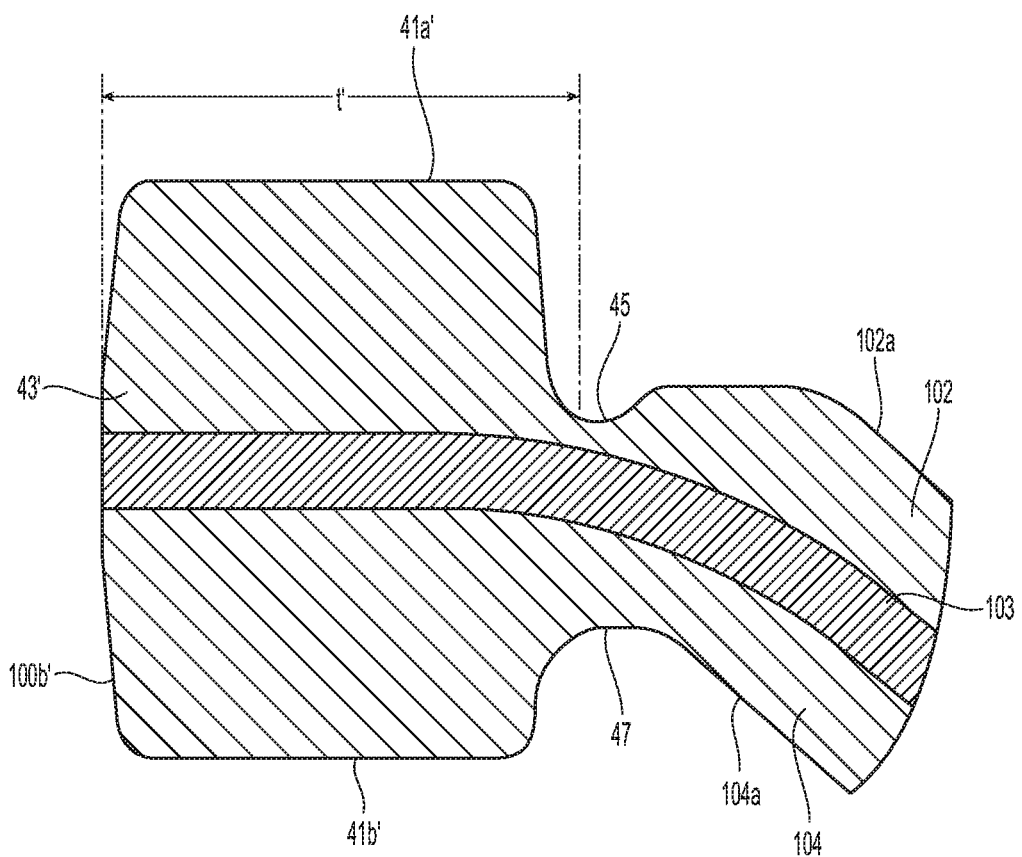
FIG. 3G is a cross-section view of another embodiment of a lip element.

In another exemplary embodiment, for example, as seen in FIG. 3G, a preferred configuration of the lip member 100b' has substantially a rectangular-shaped cross-section 43'. Preferably, the rectangular-shaped cross-section 43' includes two ends 41a', 41b' that respectively engage the upper surface 17 of the cover portion 12a of channel 36' and the lower surface 19 of the body portion 12b of channel 37'. Preferably, the thickness t' of the lip member 100b' is in a range of 0.60 inch (15.24 mm) to 1.2 inches (30.48 mm), and more preferably 0.9 inch (22.86 mm) to 1.1 inches (27.94 mm). When secured, the two ends, which are composed of a rubber or elastic material, are pinched in the cavity formed by channels 36', 37' and deformed so as to seal the control valve 10.

Preferably, the lip member 100b, 100b' is composed of a material that is not compressible. Preferably, the lip member 100b, 100b' has the same material composition as the rest of diaphragm 100. By disposing the lip member 100b, 100b' between two channels 36, 37 or 36', 37' in preferred embodiments as discussed above, minor flaws and imperfections in the flanges or the diaphragm will not prevent the lip member 100b, 100b' from sealing the valve 10.

As seen in FIGS. 3D and 3G a transition portion from the respective lip members 100b, 100b' to the flexible member 100a includes an upper curvilinear path 45 corresponding to the upper surface 102a and a lower curvilinear path 47 corresponding to the lower surface 104a. The transition portion is disposed in the gap between the respective inner radial walls, i.e. 36b and 37b or 36b' and 37b'. Preferably, the upper curvilinear path 45 has a tighter curved path than the lower curvilinear path 47. The upper and lower curvilinear paths 45, 47 preferably transition to the flexible member 100a at substantially a mid-point of the side of the respective lip member 100b, 100b'.

Figure 6:
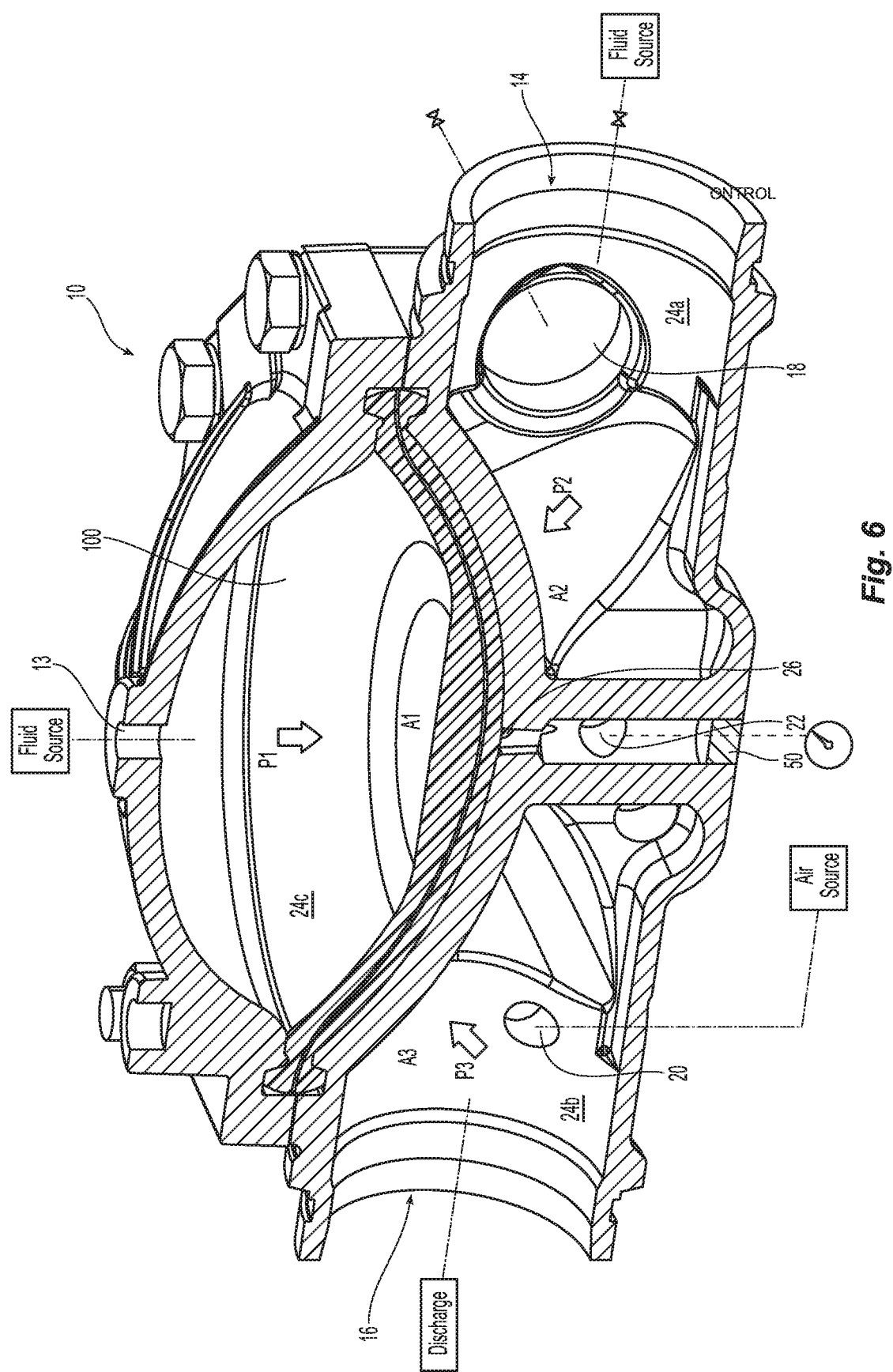
FIG. 6 is cross-sectional perspective schematic view of the control valve of FIG. 1.

Turning to FIG. 6, the control valve 10 can be placed into service by preferably bringing the valve 10 to the normally closed position and subsequently bringing the inlet subchamber 24a and the outlet sub-chamber 24b to operating pressure. In one preferred installation, the first fluid source is initially isolated from the inlet sub-chamber 24a by way of a shut-off control valve such as, for example, a manual control valve located upstream from the inlet 14. The second fluid source is preferably initially isolated from the outlet sub-chamber 24b by way of a shut-off control valve located upstream from the input opening 20. If the pressures in sub-chambers 24a and 24c are already equalized at this point, e.g. the pressures P1, P2, P3 are equal, the tension force within the diaphragm 100 and, in some embodiments, aided by the additional tension force created by the inversion inhibitor 35, will urge the flexible member 100a from the inverted position to the closed position as discussed above. If not, for example P2 and P3 are greater than P1, the following steps will place the control valve 10 in a state ready for operation. An equalizing fluid, such as water from the first fluid source is then preferably introduced into the diaphragm sub-chamber 24c through the central opening 13 in the cover portion 12a. Fluid is continuously introduced into the sub-chamber 24c until the fluid exerts enough pressure P1 to bring the flexible member 100a to the closed position in which the lower surface 104a engages the bridge element 27. In the closed position, the lower surface 104a of flexible member 100a, which in some embodiments includes the sealing members 114a, 114b, forms a sealed engagement about the seat member 26.

With the diaphragm member 100 in the closed position, the inlet and outlet sub-chambers 24a, 24b can be pressurized respectively by the first and second fluids. More specifically, the shut-off valve isolating the first fluid, e.g., water from a water main, can be opened so as to introduce the first fluid through the inlet 14 and into the inlet sub-chamber 24a to preferably achieve a static pressure P2. The shut-off valve isolating the second fluid, e.g., the compressed gas, can be opened to introduce the second fluid through the input opening 20 to pressurize the outlet sub-chamber 24b and the normally closed system, e.g., a fire system piping network, coupled to the outlet 16 of the control valve 10 to achieve a static pressure P3.

As described above, the intermediate chamber 24d is disposed between the inlet and outlet sub-chambers 24a, 24b and is normally open to atmosphere. The primary fluid pressure P2 is isolated from chamber 24d by the sealing member 114a and the secondary fluid pressure P3 is isolated from chamber 24d by the sealing member 114b. Thus, diaphragm member 100, and in some embodiments its sealing members 114a, 114b, is configured so as to maintain the sealed engagement with the seat member 26 under the influence of the diaphragm chamber pressure P1. Accordingly, when in the closed position, the upper and lower diaphragm surface areas A1, A2, and A3 are preferably sized such that the force provided by pressure P1 is large enough to overcome the forces provided by primary and secondary fluid pressures P2, P3 urging the diaphragm member 100 to the open position. However, the upper and lower diaphragm surface areas A1, A2, and A3 are also sized to provide a fast opening response. Because the flexible member 100a is not as rigid as prior art and related art diaphragms, the valve 10 has a faster opening response than such diaphragms when fluid is released from the inlet chamber. In addition, the pressure drop due to the diaphragm and/or biasing devices such as ribs and springs is also minimized.

To actuate the valve 10, fluid is preferably released from the diaphragm sub-chamber 24c at a faster rate than it can be replenished into the sub-chamber 24c. For example, a solenoid control valve coupled to the chamber inlet 13 can be electrically actuated to release fluid from the diaphragm sub-chamber 24c. The loss of pressure on the upper surface 102a of the diaphragm member 100 permits the fluid pressure in the adjacent fluid supply sub-chamber 24a to urge the diaphragm member to the open position spaced from the seat member 26. Fluid is permitted to flow past the support members 28a, 28b to displace the compressed gas in the outlet sub-chamber 24b for discharge out the outlet 16 and into the system coupled to the control valve 10. Fluid is further permitted to fill the groove 30 and flow out the alarm port 22. With an appropriate flow alarm coupled to the port 22, fluid flow can be detected and appropriate personnel can be notified of the operation of the valve 10. Accordingly, the control valve 10 can be installed in a preaction fire protection systems with its outlet 16 in communication with a riser pipe that is coupled to a network of sprinklers interconnected by pipes and pressurized by the compressed gas or air.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fluid control valve comprising:
   a cover portion with a first inner surface;
   a body portion with a second inner surface, the body portion including an elongated seat member substantially aligned along a plane perpendicular to a flow axis of the fluid control valve, the first and second inner surfaces defining a chamber when the cover portion and the body portion are joined, the chamber including an inlet and an outlet in communication with the chamber; and
   a diaphragm disposed between the cover portion and the body portion, the diaphragm including a flexible member disposed in the chamber and having a first position in which the flexible member is inverted to define a passageway to permit communication between the inlet and the outlet and a second position to prevent fluid communication between the inlet and the outlet,
   wherein an upper surface of the flexible member has a substantially smooth wall portion and, when the flexible member is inverted, an entirety of the upper surface contacts the inner surface of the cover portion, and wherein a lower surface of the flexible member and the elongated seat member have corresponding radius of curvatures such that the flexible member conforms to and seals against the elongated seat member when the flexible member is in the second position;

wherein a ratio of the radius of curvature of the lower surface of the flexible member to the radius of curvature of the upper surface of the flexible member is in a range of 1.05 to 1.15.

2. The fluid control valve of claim 1, wherein a thickness of the flexible member in a range of 0.30 inch (7.62 mm) to 1.0 inch (25.4 mm).

3. The fluid control valve of claim 1, wherein the elongated seat member is part of a bridge element that bisects the body portion along the plane to define a first side and a second side, and wherein the body portion further includes one or more first support members disposed on the first side and one or more second support members disposed on the second, the first and second support members being disposed about and engaged with the bridge element.

4. The fluid control valve of claim 3, wherein the bridge element includes a groove, a portion of the body portion further defining a port in communication with the groove, and wherein the lower surface of the flexible member includes a pair of elongated members to aid in sealing the flexible member against the elongated seat member, the pair of elongated members being spaced apart to define a channel therebetween, the channel in communication with the groove to define an intermediate chamber in communication with the port when the flexible member is in the second position.

5. The fluid control valve of claim 4, wherein the flexible member defines a central axis substantially perpendicular to the flow axis and parallel to the plane, and wherein each of the elongated members defines a sidewall surface of the channel.

6. The fluid control valve of claim 3, wherein the body portion includes an input opening and a fluid drain opening disposed about the bridge element, the input opening being in communication with the outlet and the fluid drain opening being in communication with the inlet.

7. The fluid control valve of claim 1, wherein the lower surface of the flexible member includes at least one elongated member to aid in sealing the flexible member against the elongated seat member.

8. The fluid control valve of claim 7, wherein the at least one elongated member has a cross-sectional area that is one of a semicircle, a semi-ellipse and a semi-oval shape.

9. The fluid control valve of claim 1, wherein the substantially smooth wall portion defines a substantially semi-spherical bowl.

10. The fluid control valve of claim 1, wherein the inner surface of the cover portion has a concave profile.

11. The fluid control valve of claim 1, wherein the substantially smooth wall portion circumscribes a central portion.

12. The fluid control valve of claim 1, wherein the diaphragm includes a reinforced fabric embedded in a rubber matrix, and wherein a tension force is concentrated in the reinforced fabric when the flexible member is in the first position.

13. A method of operating a fluid control valve having a cover portion with an inner surface, a body portion having an elongated seat member substantially aligned along a plane perpendicular to a flow axis of the fluid control valve, and a diaphragm having a flexible member that has an upper surface and a lower surface, the method comprising:

inverting the flexible member to contact an entirety of the upper surface of the flexible member to the inner surface of the cover portion by removing fluid pressure from the upper surface of the flexible member, the inverted position of the flexible member permitting fluid communication between an inlet and an outlet of the fluid control valve; and applying pressure on the upper surface such that corresponding radius of curvatures of the lower surface and the elongated seat member form a seal;

wherein a ratio of the radius of curvature of the lower surface of the flexible member to the radius of curvature of the upper surface of the flexible member is in a range of 1.05 to 1.15.

14. The method of claim 13, wherein, when the pressures on the upper surface and the lower surface of the flexible member are substantially equalized, the flexible member seals against the elongated seat member so as to prevent fluid communication between the inlet and the outlet.

15. The method of claim 13, further comprising creating a tension force in a reinforced fabric layer of the flexible member when the flexible member is inverted to urge the flexible member to a non-inverted position.

16. A diaphragm for a fluid control valve, comprising:

a lip member to be secured between a cover portion and a body portion of the fluid control valve; and a flexible member for controlling fluid communication in the fluid control valve, an upper surface of the flexible member having a substantially smooth wall portion that has a constant radius of curvature, the flexible member configured to move to an inverted position that defines a passageway in the fluid control valve to permit fluid communication between an inlet and an outlet of the fluid control valve, an upper surface of the flexible member has a substantially smooth wall portion and an entirety of the upper surface contacts the inner surface of the cover portion in the inverted position, wherein the diaphragm is configured such that tensioning the diaphragm in the inverted position biases the flexible member such that the flexible member moves from the inverted position to a non-inverted position when pressures on the upper surface and a lower surface of the flexible member are substantially equalized;

wherein a ratio of the radius of curvature of the lower surface of the flexible member to the radius of curvature of the upper surface of the flexible member is in a range of 1.05 to 1.15.

17. The diaphragm of claim 16, wherein the lower surface of the flexible member includes at least one elongated member to aid in sealing the flexible member against a seat member of the fluid control valve to prevent fluid communication between the inlet and the outlet of the fluid control valve.

18. The diaphragm of claim 16, wherein the flexible member includes a reinforced fabric that is embedded in a rubber matrix, and wherein tensioning the diaphragm includes creating a tension force that is concentrated in the reinforced fabric when the flexible member is inverted.

* * * * *